(12) United States Patent
Porter et al.

(10) Patent No.: US 12,491,348 B2
(45) Date of Patent: Dec. 9, 2025

(54) SYSTEMS AND ASSOCIATED METHODS FOR IMPROVED INTERROGATION OF SHUNT FUNCTIONALITY

(71) Applicants: Dignity Health, San Francisco, CA (US); Texas A&M University, College Station, TX (US)

(72) Inventors: Randall W. Porter, Phoenix, AZ (US); Clinton D. Morgan, II, San Francisco, CA (US); Michael Mooney, San Francisco, CA (US); Sung Il Park, College Station, TX (US)

(73) Assignees: Dignity Health, San Francisco, CA (US); Texas A&M University, College Station, TX (US)

( * ) Notice: Subject to any disclaimer, the term of this patent is extended or adjusted under 35 U.S.C. 154(b) by 399 days.

(21) Appl. No.: 17/635,641

(22) PCT Filed: Aug. 17, 2020

(86) PCT No.: PCT/US2020/046715
§ 371 (c)(1),
(2) Date: Feb. 15, 2022

(87) PCT Pub. No.: WO2021/030809
PCT Pub. Date: Feb. 18, 2021

(65) Prior Publication Data
US 2022/0288362 A1 Sep. 15, 2022

Related U.S. Application Data

(60) Provisional application No. 62/887,138, filed on Aug. 15, 2019.

(51) Int. Cl.
*A61M 27/00* (2006.01)
*A61B 5/00* (2006.01)
(Continued)

(52) U.S. Cl.
CPC ......... *A61M 27/006* (2013.01); *A61B 5/0022* (2013.01); *A61B 5/0031* (2013.01);
(Continued)

(58) Field of Classification Search
CPC .. A61M 27/006; A61B 5/0022; A61B 5/0031; A61B 5/053; A61B 2562/0247;
(Continued)

(56) References Cited

U.S. PATENT DOCUMENTS 4,156,422 A * 5/1979 Hildebrandt ........ A61M 27/006
604/9
6,524,256 B2 * 2/2003 Schaldach ............ A61B 5/0215
600/488

(Continued)

OTHER PUBLICATIONS

Patent Cooperation Treaty, International Search Report and Written Opinion, International Application No. PCT/US2020/046715, date of mailing Oct. 30, 2020, 10 pages.

*Primary Examiner* — Ariana Zimbouski
(74) *Attorney, Agent, or Firm* — Polsinelli PC

(57) ABSTRACT

Embodiments of a system for improved interrogation of shunt functionality are disclosed. The system includes a fluid flow detector having a microfluidic chamber configured for receiving the passage of bodily fluid flow. The fluid flow detector generates measurements and other data and provides wireless access to the same.

14 Claims, 35 Drawing Sheets

(51) Int. Cl.
*A61B 5/053* (2021.01)
*A61N 1/20* (2006.01)

(52) U.S. Cl.
CPC .............. *A61B 5/053* (2013.01); *A61N 1/205* (2013.01); *A61B 2562/0247* (2013.01)

(58) Field of Classification Search
CPC ......... A61B 5/746; A61B 5/0538; A61B 5/03; A61N 1/205
See application file for complete search history.

(56) References Cited

U.S. PATENT DOCUMENTS

| | | | | |
|---|---|---|---|---|
| 2005/0204811 A1* | 9/2005 | Neff | ................... | A61M 27/006 604/9 |
| 2006/0264799 A1* | 11/2006 | Caluori | ................ | A61B 5/4261 604/9 |
| 2009/0105557 A1* | 4/2009 | Najafi | .................. | A61B 5/0537 600/301 |
| 2010/0130884 A1* | 5/2010 | Linninger | .............. | A61B 5/053 600/561 |
| 2011/0066072 A1* | 3/2011 | Kawoos | ................. | A61B 5/031 600/561 |
| 2012/0190956 A1* | 7/2012 | Connolly | ............... | A61B 5/685 156/60 |
| 2013/0303967 A1* | 11/2013 | Utz | ..................... | A61M 27/006 604/8 |
| 2016/0199561 A1* | 7/2016 | Dacey, Jr. | ............. | A61M 1/915 210/489 |
| 2016/0331949 A1* | 11/2016 | Lutz | .................... | A61M 27/006 |

\* cited by examiner

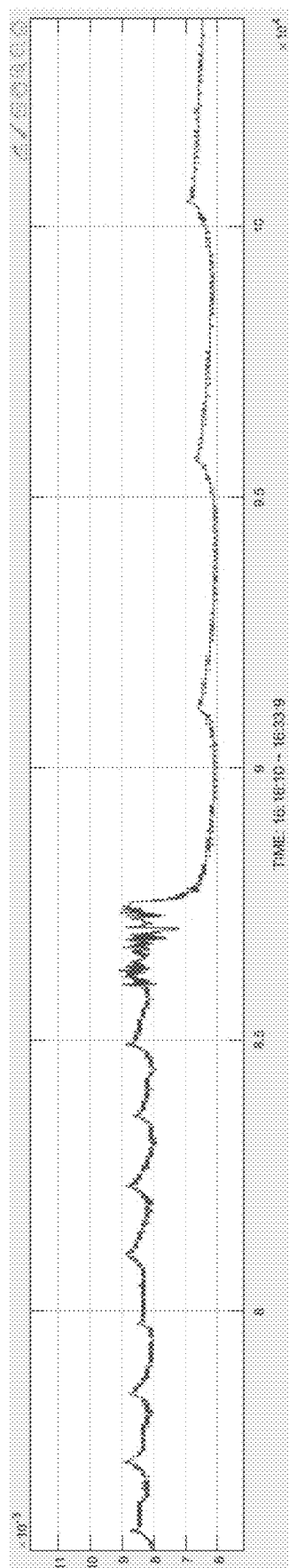

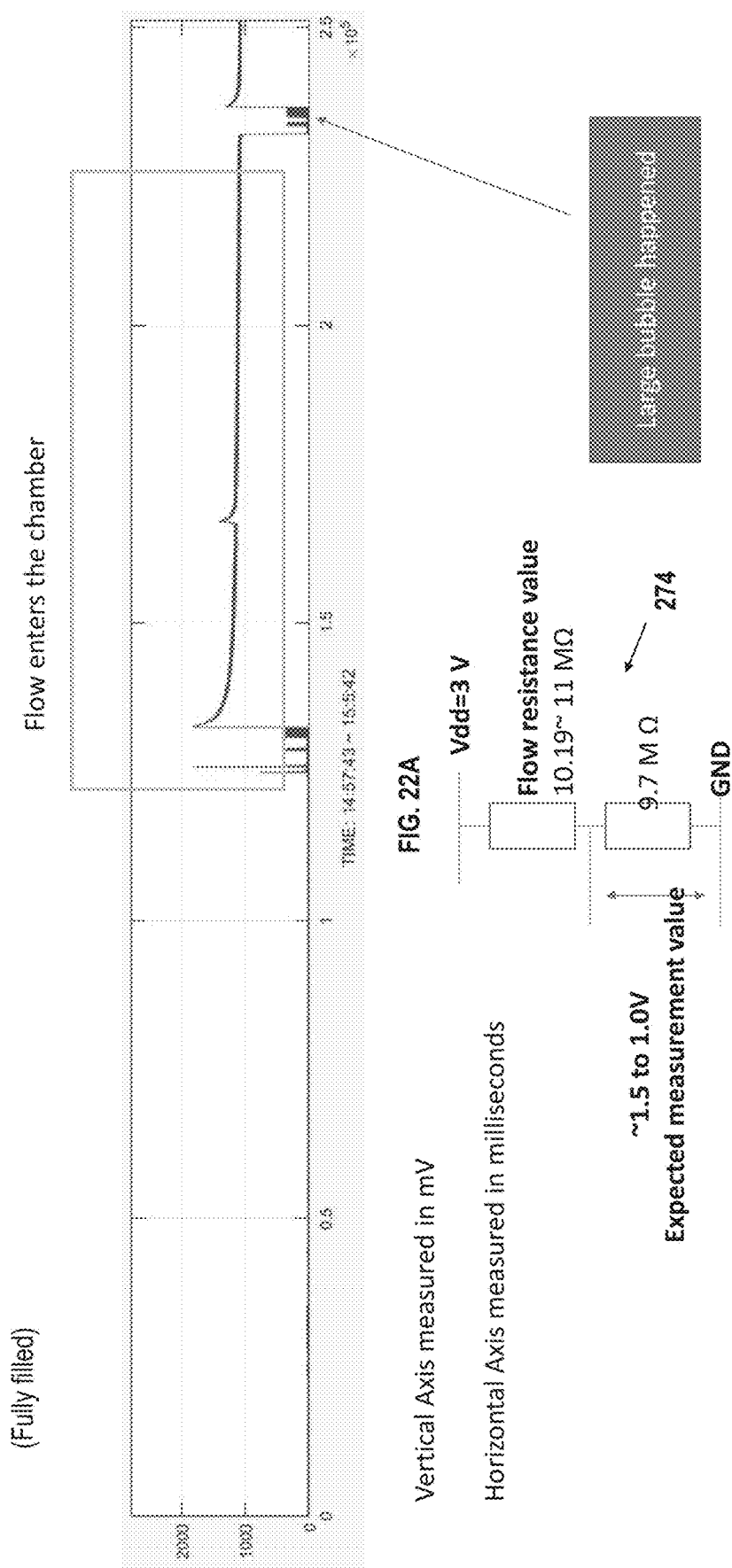

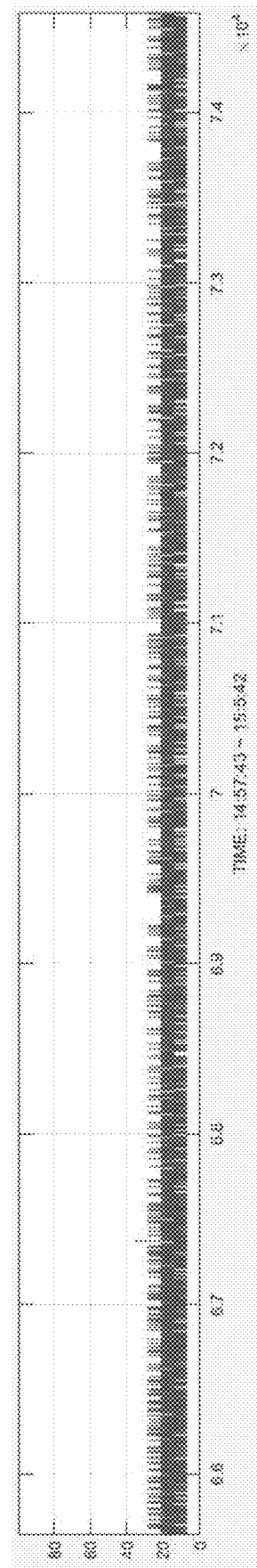
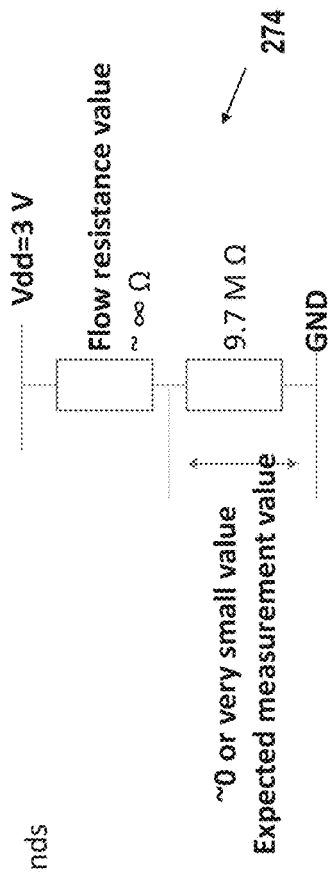
(No Flow Present)
FIG. 23A
Vertical Axis measured in mV
Horizontal Axis measured in milliseconds
Average Voltage: 14.2 mV
Range: 7.1 – 28.4 mV
FIG. 23B

Magnet Actuation Mechanism
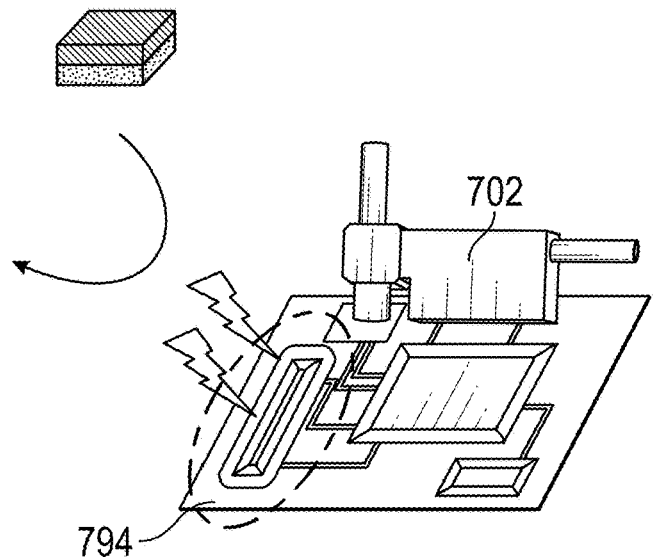
Switching Circuit Activation
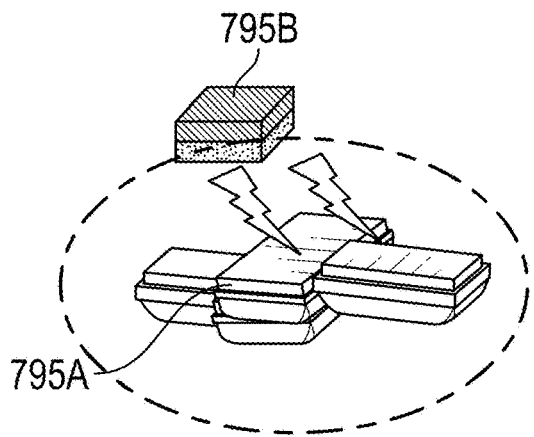
Switching Circuit Deactivation
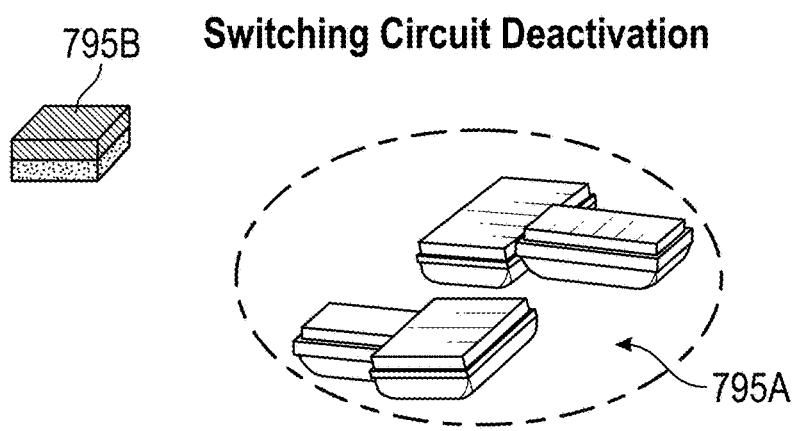
FIG. 29

| Flow (mL/min) | Ø (mm) | | |
|---|---|---|---|
| | 1.1 | 1.3 | 1.5 |
| 0.01 | 1.77 | 1.81 | 1.84 |
| 0.1 | 17.83 | 18.13 | 18.51 |
| 0.3 | 53.83 | 54.71 | 55.36 |

$P_{atm}$
Dry conditions

FIG. 33

SYSTEMS AND ASSOCIATED METHODS FOR IMPROVED INTERROGATION OF SHUNT FUNCTIONALITY

CROSS REFERENCE TO RELATED APPLICATIONS

The present document is a PCT patent application that claims benefit to U.S. provisional patent application Ser. No. 62/887,138 filed on Aug. 15, 2019, which is herein incorporated by reference in its entirety.

FIELD

The present disclosure generally relates to systems and associated methods for improved interrogation or assessment of shunt functionality; and in particular, relates to a fluid flow detector device configured to engage with shunt tubing to detect cerebrospinal fluid flow and further configured with wireless communication functions associated with the cerebrospinal fluid flow detection.

BACKGROUND

Shunts are medical devices having various tubes referred to as catheters or shunt tubing. Shunts are minimally used to allow excess fluids that build up in one portion of the body to be drained into another portion of the body, thereby normalizing fluid flow pressure in the first portion of the body. Typically, patients are implanted with one or more catheters, separated by one or more one-way valves to allow the excess fluid to periodically drain from the over-pressurized area in the body.

Ventriculoperitoneal shunts are often considered the cornerstone of permanent indwelling cerebrospinal fluid diversion needed as sequelae of a variety of neurological conditions, including brain tumors, brain hemorrhage, and congenital defects like spina bifida, normal pressure hydrocephalus, and idiopathic intracranial hypertension. As a general example, these shunts may allow passage of cerebrospinal fluid from the ventricles in the brain to the peritoneal cavity. However, the valves of these shunts often become occluded, and are otherwise dangerously prone to malfunction and infection. Shunt occlusion may be caused by inadvertent manipulation or kinking of a shunt catheter, or migration of the distal catheter out of the peritoneum, thereby reducing or preventing the flow of cerebrospinal fluid. Symptoms of a blocked shunt system can be serious if left unchecked, and can result in frequent visitations to the emergency room.

Unfortunately, shunt function interrogation to analyze possible shunt occlusion or other shunt failures is primitive, morbid to the patient, dangerous, and costly. Interrogation often requires either general anesthesia including operating room deconstruction of the shunt system, or exposure to radioactive isotopes for low-quality qualitative flow assessment. The $200 million spent annually interrogating malfunctioning shunts in the US is accrued due to cost of hospital admission, emergency room visits, lumbar punctures, radioactive nucleotide testing, and operative exploration. While some efforts have been made to modernize ventriculoperitoneal shunts, most falter in their design and failure to provide a parsimonious solution which is both patient-centered and simple-to-execute.

It is with these observations in mind, among others, that various aspects of the present disclosure were conceived and developed.

BRIEF DESCRIPTION OF THE DRAWINGS

FIG. 16 is a graph illustrating additional measurements from the testing of FIG. 14.

FIG. 22A is a graph and FIG. 22B is a simplified electrical diagram indicating measurements derived from the resistance measurement test of FIGS. 21A-21B when a fluid flow detector is fully filled with a fluid.

FIG. 23A is a graph and FIG. 23B is a simplified electrical diagram indicating measurements derived from the resistance measurement test of FIGS. 21A-21B when a fluid flow detector is fully filled with a fluid.

FIG. 29 is an illustration showing operation of a wake-up circuit of the fluid flow detector of FIG. 25.

FIG. 33 is a table showing pressure measurement (Pa) in a shunt chamber of the fluid flow detector of FIG. 25 for flow 0.01/0.1/0.3 mL/min and inlet diameter 1.1/1.3/1.5 mm.

Corresponding reference characters indicate corresponding elements among the view of the drawings. The headings used in the figures do not limit the scope of the claims.

DETAILED DESCRIPTION

Figure 1A:
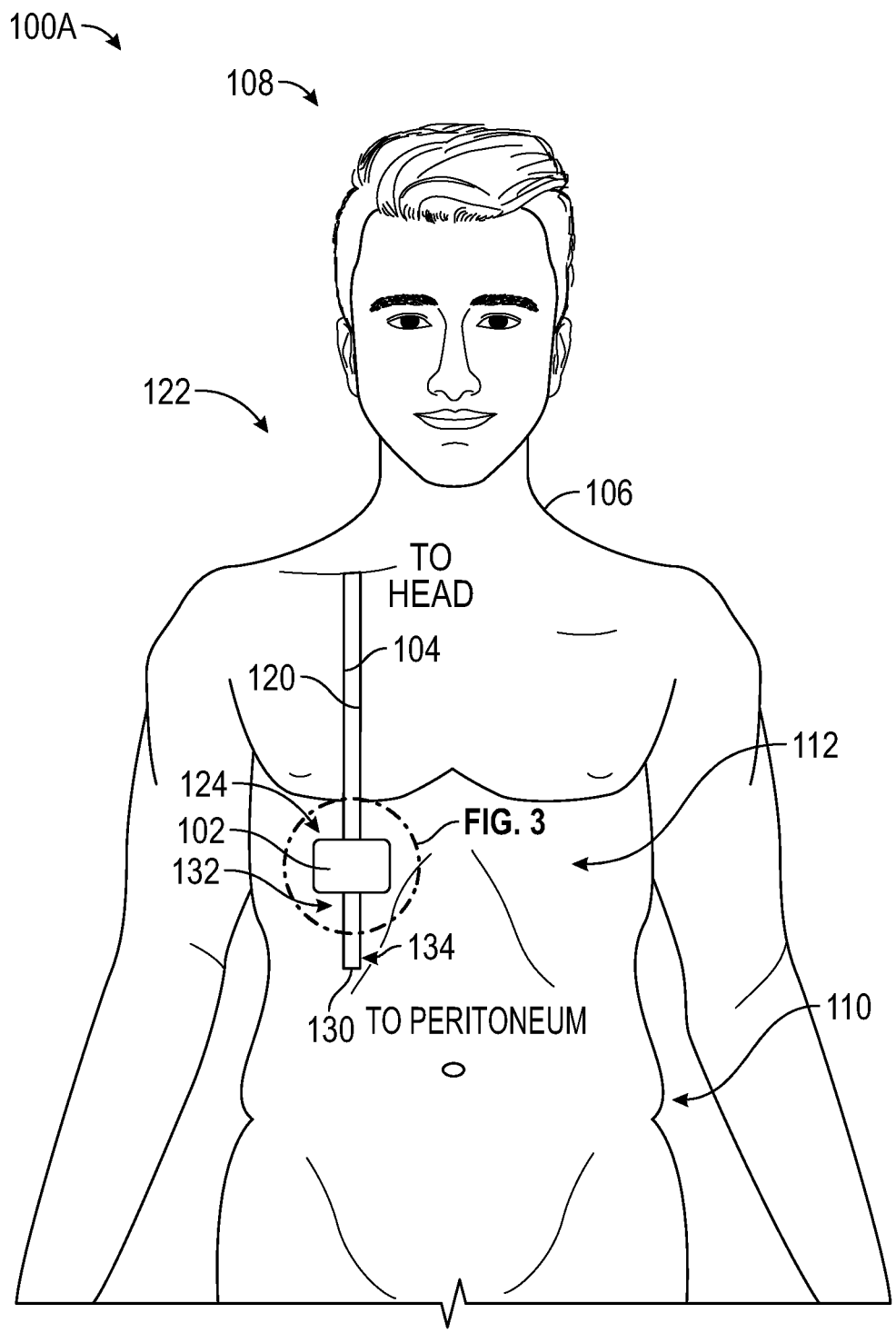
FIG. 1A is an anterior view of a first embodiment of a system for fluid flow detection system, according to one aspect of the present disclosure.

Various embodiments of a system for improved interrogation of shunt functionality are disclosed herein. In some embodiments, the system described herein includes a fluid flow detector in the form of an electronic device in selective fluid flow communication with one or more catheters of a shunt. In some embodiments, the fluid flow detector includes a body having a chamber defining a fluid pathway in fluid flow communication between an inlet port and an outlet port. In some embodiments, the fluid flow detector is engaged to the shunt so as to permit fluid flow of cerebrospinal fluid from a first catheter, through the chamber of the fluid flow detector, to a second catheter of the shunt. The fluid flow detector may be implanted generally along a subcutaneous region of the abdomen.

In addition, the fluid flow detector may include one or more electrode elements or other electrical components for generating data including measurements about the cerebrospinal fluid flow such as flow rate or fluid pressure, and the fluid flow detector may be or otherwise include a wireless device configured with various data management functions to e.g., transmit such data or otherwise make such data available to one or more external devices. Referring to the drawings, embodiments of a system including a fluid flow detector for assessing cerebrospinal fluid flow and interrogating shunt functionality are illustrated and generally indicated as 100A and 100B in FIGS. 1-39.

Referring to FIG. 1A, one embodiment of a system for improved interrogation of shunt functionality, designated 100A, is illustrated. The system 100A may define a distal cerebrospinal fluid system that may be MRI-compatible, battery-free, fully-implantable, commercially universal, and configured to circumvent costly, morbid, and primitive means for interrogating shunt function. The system 100A includes a fluid flow detector 102, which may be in the form of a wireless electronic device configured with different mechanical electrical features and functionality for interrogating shunt functionality as described herein, and may be universally connectable to any commercial ventriculoperitoneal shunt system (VPS).

As shown, the fluid flow detector 102 may be in fluid flow communication or otherwise engaged to a ventriculoperitoneal shunt (hereinafter "shunt") 104 configured to direct cerebrospinal fluid along a patient 106 from a cranium or head region 108 of the patient 106 to a periosteum region 110 of the patient 106. The fluid flow detector 102 may be implanted within the patient 106 in a location distally away from the cranium region 108 and within a subcutaneous space within an abdominal region 112 of the patient 106, just proximal to the distal termination of the shunt 104. In this manner, the fluid flow detector 102 is located in a more hospitable environment as compared with locations closer to the cranium region 108.

As further shown, in some embodiments, the shunt 104 may define a first (incoming) catheter 120 positioned along the cranium region 108 of the patient 106 with a first end 122 of the first catheter 120 engaged to a surgical site (not shown), and a second end 124 of the first catheter 120 engaged to the fluid flow detector 102. In addition, the shunt 104 may define a second (descending) catheter 130 positioned along the abdominal region 112 of the patient 106 with a first end 132 of the second catheter 130 engaged to the fluid flow detector 102, and a second end 134 of the second catheter 130 defining the distal termination of the shunt 104. In this manner, a proximal connection is made between the fluid flow detector 102 and the shunt 104 using the first catheter 120, and a distal connection is made between the fluid flow detector 102 and the second catheter 130 so as to permit fluid flow of cerebrospinal fluid from the first catheter 120 of the shunt 104, through the fluid flow detector 102, to the second catheter 130 of the shunt 104 and ultimately into the peritoneal region 110 for cerebrospinal fluid drainage.

Figure 1B:
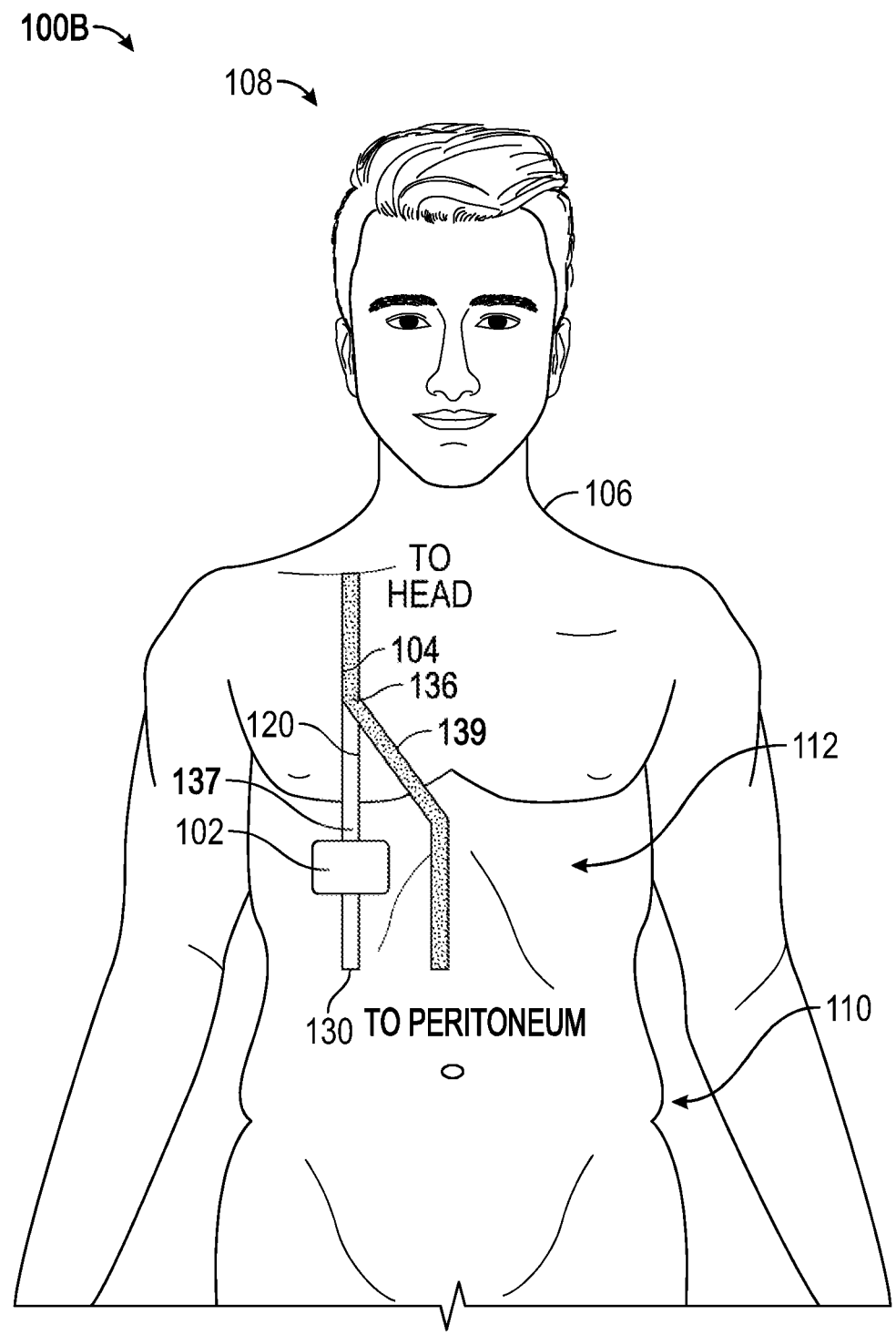
FIG. 1B is an anterior view of a second embodiment of a system for fluid flow detection system, according to one aspect of the present disclosure.

Referring to FIG. 1B, another embodiment of a system for improved interrogation of shunt functionality, designated 100B, is illustrated. Similar to the system 100A, the system 100B may include the fluid flow detector 102 in fluid flow communication or otherwise engaged to the shunt 104 such that the system 100B is configured to direct cerebrospinal fluid along a patient 106 from a cranium or head region 108 of the patient 106 to a periosteum region 110 of the patient 106. The fluid flow detector 102 may be implanted within the patient 106 in a location distally away from the cranium region 108 and within a subcutaneous space within an abdominal region 112 of the patient 106, just proximal to the distal termination of the shunt 104. In addition, the fluid flow detector 102 is in fluid flow communication with the first catheter 120 and the second catheter 130.

As shown in FIG. 1B however, in some embodiments a slight variation of the first catheter 120 of the shunt 104 is contemplated where the shunt 104 defines a junction 136 along the first catheter 120. In this manner, a first portion of the cerebrospinal fluid incoming from the surgical site may be diverted into the fluid flow detector 102 via a first portion 137 of the first catheter 120, and a second portion of the cerebrospinal fluid may be passed from the surgical site directly to the peritoneal region 110 by way of an additional portion 139 of the first catheter 120 defined by the junction 136.

Figure 2:
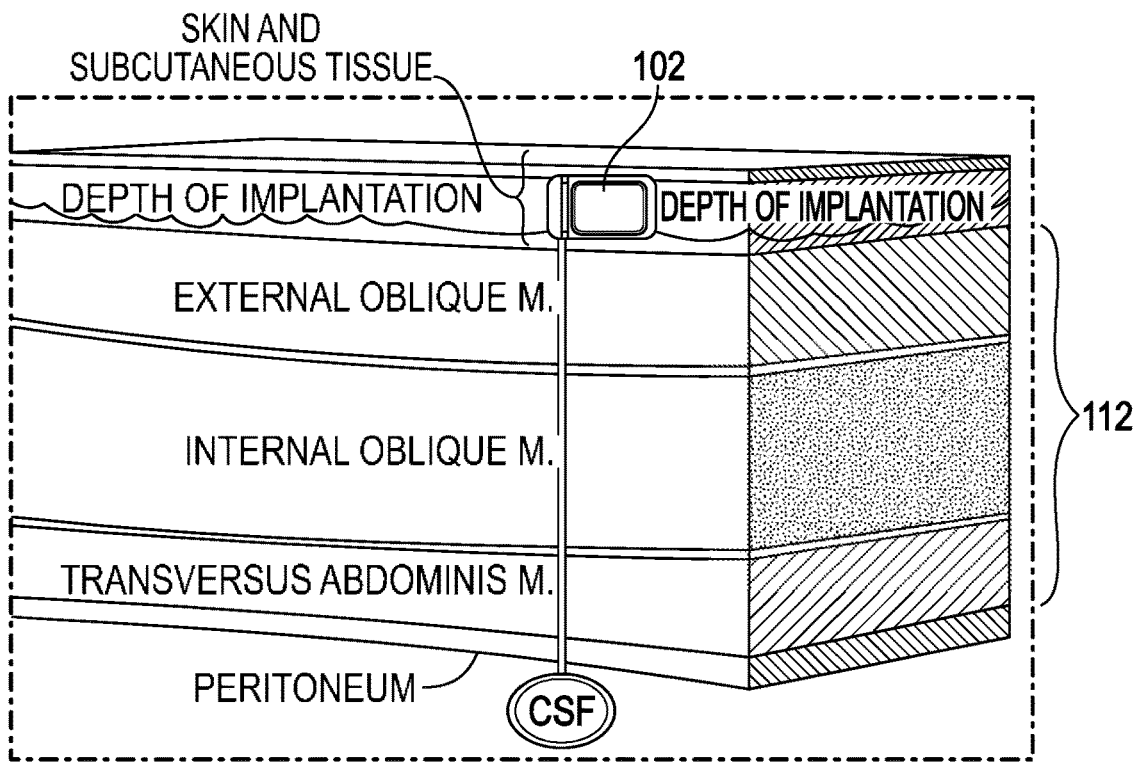
FIG. 2 is a perspective view of the fluid flow detector of FIG. 1A implanted within a patient, according to aspects of the present disclosure.

Referring to FIG. 2, the fluid flow detector 102 may be implanted generally within the abdomen region 112, proximate to the external oblique. In some embodiments, the fluid flow detector 102 may be implanted in one of four anatomic layers: (1) directly underneath the skin, (2) underneath skin and subcutaneous fat, (3) under skin, subcutaneous fat, and aponeurosis, and (4) under skin, subcutaneous fat, aponeurosis, and bone. As noted, the implantation of the fluid flow detector 102 in the abdomen region 112 for interrogation of shunt functionality improves upon past interrogation methods involving invasive procedures closer to the spine and cranium region 108 (not shown in FIG. 2).

Figure 3:
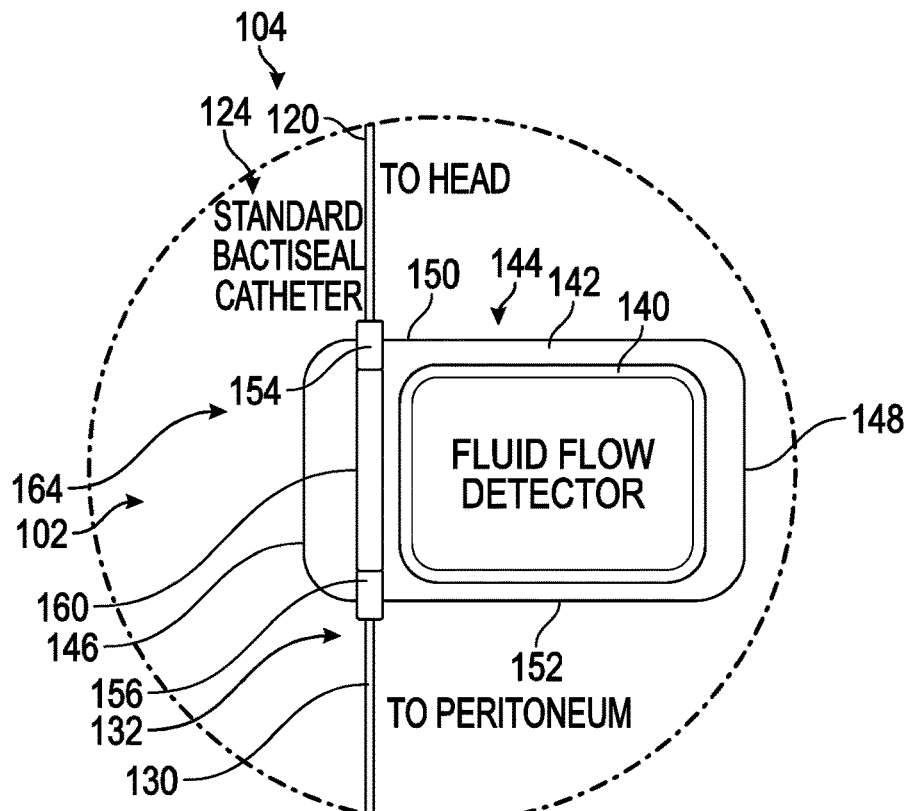
FIG. 3 is an enhanced view of a portion of FIG. 1A illustrating one embodiment of a fluid flow detector described herein which may be implemented with the systems of FIG. 1A or FIG. 1B, according to one aspect of the present disclosure.

Referring to FIG. 3, one embodiment of the fluid flow detector 102 may take the form of a wireless electronic device and may define a biocompatible body 140. In some embodiments, the body 140 may be MRI-compatible titanium having dimensions of 2-3 cm by 2-3 cm, although the present inventive concept is not limited in this regard and in some embodiments the body 140 may also include a soft polymer such as PDMS or another material such as ceramic. The body 140 may collectively be defined by a top portion 142, a bottom portion 144, a first side portion 146, an opposite second side portion 148, a first end portion 150, and an opposite second end portion 152. An inlet port 154 is defined along the first end portion 150 and an outlet port 156 is defined along the second end portion 152 and serially aligned with the inlet port 154.

The inlet port 154 may define a predetermined connection or shape configured to engage in fluid tight engagement with the second end 124 of the first catheter 120 of the shunt 104. Similarly, the outlet port 156 may define a predetermined connection or shape configured to engage in fluid tight engagement with the first end 132 of the second catheter 130 of the shunt 104. In some embodiments, each of the inlet port 154 and the outlet port 156 may define a plastic coupling mechanism allowing universal connection to any standard commercial cerebrospinal fluid shunt catheter.

In addition, a microfluidic chamber 160 may be defined along the body 140 between and in fluid flow communication with the inlet port 154 and the outlet port 156 as shown. The microfluidic chamber 160 defines a lumen that establishes a fluid pathway between the inlet port 154 and the outlet port 156 of the body 140. In use, cerebrospinal fluid (in the function of any standard VPS) flows in a laminar fashion through the first catheter 120 (via the second end 124) into the microfluidic chamber 160. In some embodiments, electrode elements 164, assessing fluid current changes within the microfluidic chamber 160, detect flow rate (mL/hour) and fluid pressure (cm H20). Once fluid flow along the microfluidic chamber 160 occurs, the flow exits via negative pressure gradient at the distal second end portion 152 of the fluid flow detector 102 (along the first end 132 of the second catheter 130). In its standard clinical fashion, cerebrospinal fluid may then be permitted to drain freely into the peritoneal region 110 (shown in FIG. 1A) by way of the second catheter 130.

In some embodiments, the fluid flow detector 102 includes a near-field communication (NFC) chip (not shown). This NFC chip directly interfaces with the electrode elements 164 or flow sensors via flexible cables (not shown), capture any variation in flow rate, and extract flow rate or pressure data from the sensors. When a smart phone or other compatible device requests information from the fluid flow detector 102, the fluid flow detector 102 is configured to provide data in real time. The passive nature of this approach reduces power consumption down to mW and thereby provides more advantageous power budgets while minimizing side effects associated with tissue damage caused by heat generation from a power harvesting unit. The fluid flow detector 102 also provides access to an internal memory (not shown) in which critical information on patient and surgery such as historical flow rate data, historical pressure data, and provider-generated critical shunt data including shunt setting history, and indications for cerebrospinal fluid shunt can be stored. Capabilities to monitor any variation in flow rate over a period of time and automatically store information into an internal memory may accommodate sensitive and accurate assessment of flow rate under a variety of physiological conditions or any circumstances caused by an unexpected or abnormal event. Furthermore, the NFC chip offers an extremely high level of security clearance and thereby facilitates reliable, robust read/write access with portable devices. In addition, a wireless coil (not shown) may be implemented to induce inductive coupling between a smart device and the fluid flow detector 102 to power the wireless NFC chip. Such battery-free operation obviates the need for a large battery pack, accessories, associated electronic components, and reduces the number of components required for desired function, enabling low cost construction and low-maintenance. In other embodiments, the fluid flow detector 102 may further include an alarming mechanism (not shown) which would allow signaling to the patient or family if hyper-acute distal flow cessation is detected, warning the patient/family before malignant intracranial fluid pressures, protecting the patient from morbidity or mortality from undetected impending shunt failure.

Figure 4:
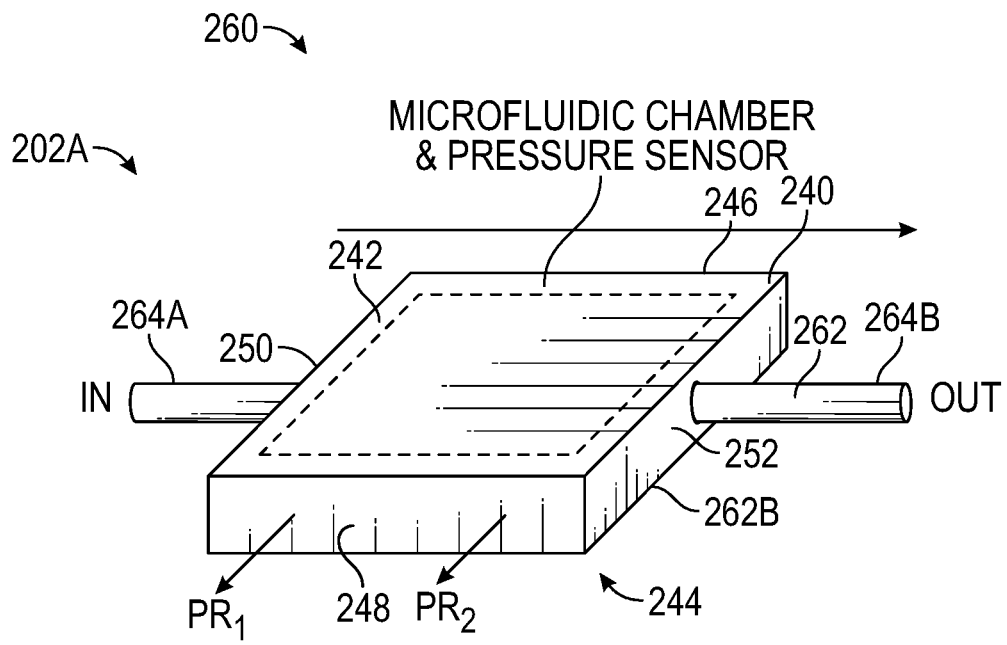
FIG. 4 is a perspective view of another embodiment of a fluid flow detector described herein which may be implemented with the systems of FIG. 1A or FIG. 1B, according to one aspect of the present disclosure.

Referring to FIG. 4, another embodiment of a fluid flow detector, designated 202A, is shown with a novel fluidic chamber design, and configured for generating measurements of cerebrospinal fluid flow (CSF). Flow rate of CSF ranges sub-micro liter per minute, which requires a highly sensitive flow sensor for detection of variations in flow rates. Unfortunately, flow sensors available on the market are unable to measure flow rates of CSF due to their low sensitivity. Therefore, there is an unmet need as well as technical problems associated with measurements of CSF for shunt interrogation.

In view of the aforementioned considerations, and similar to the fluid flow detector 102, the fluid flow detector 202A provides an improvement and technical solution for measuring CSF for shunt interrogation or otherwise. The fluid flow detector 202A may take the form of a wireless electronic device and may define a biocompatible body 240. In some embodiments, the body 240 may be MRI-compatible titanium having dimensions of 2-3 cm by 2-3 cm, although the present inventive concept is not limited in this regard. The body 240 may collectively be defined by a top portion 242, a bottom portion 244, a first side portion 246, an opposite second side portion 248, a first end portion 250, and an opposite second end portion 252. A portion of the fluid flow detector 202A may define a microfluidic chamber 260 and may include a microfluidic channel 262 defined through the body 240 from the first end portion 250 to the second end portion 252. In some embodiments, the microfluidic channel 262 defines a lumen that establishes a fluid pathway between an inlet port 264A and an outlet port 264B of the body 140. Similar to the fluid flow detector 102, the microfluidic channel 262 may be engaged with one or more catheters (not shown) using the system 100A, the system 100B, or otherwise.

Figure 5:
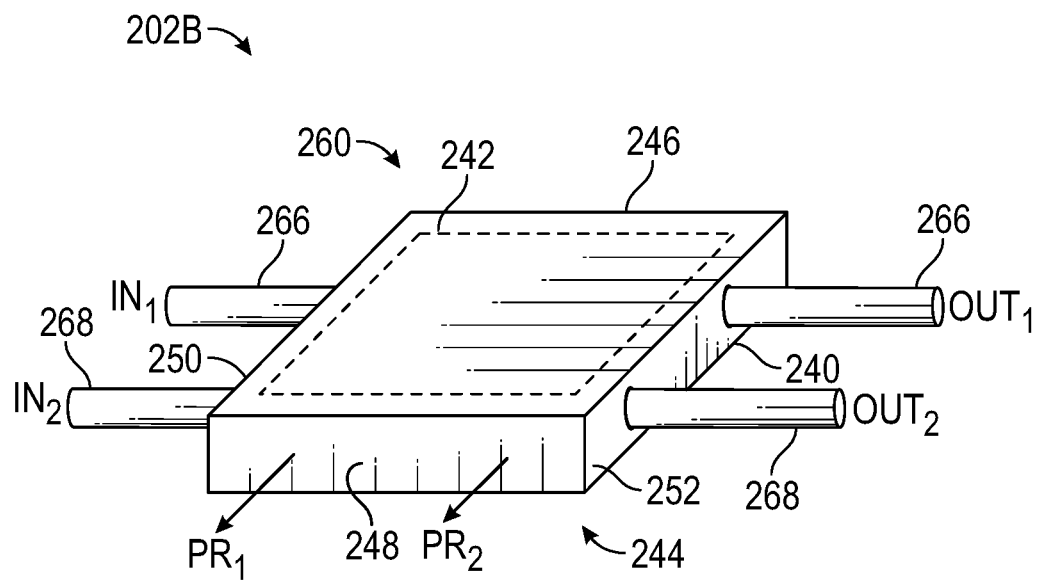
FIG. 5 is a perspective view of another embodiment of a fluid flow detector described herein which may be implemented with the systems of FIG. 1A or FIG. 1B, according to one aspect of the present disclosure.

The fluid flow detector 202B of FIG. 5 illustrates one possible variation to the fluid flow detector 202A. Like the fluid flow detector 202A, the fluid flow detector 202B may also take the form of a wireless electronic device and may define the biocompatible body 240, which as described may collectively be defined by the top portion 242, bottom portion 244, first side portion 246, opposite second side portion 248, first end portion 250, and opposite second end portion 252. A portion of the fluid flow detector 202B may define the microfluidic chamber 260.

However, as shown, the fluid flow detector 202B may include a dual microfluidic channel arrangement defined by a pair of microfluidic channels (referred to individually as microfluidic channel 266 and microfluidic channel 268) aligned in parallel relation to one another and formed within the body 240 from the first end portion 250 to the second end portion 252.

Figure 6:
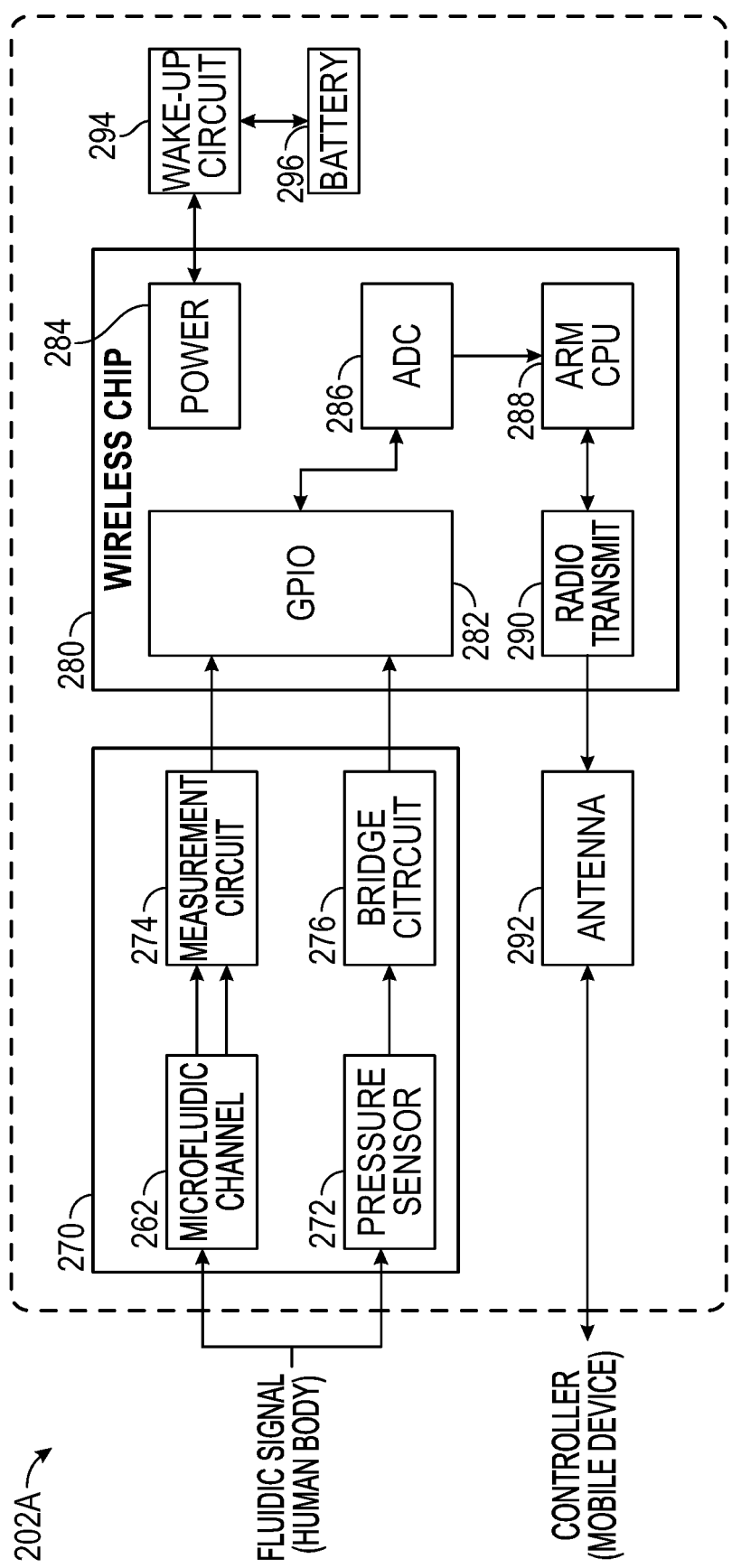
FIG. 6 is a simplified block diagram of an exemplary electrical circuit illustrating possible electrical proprieties of the fluid flow detector of FIG. 5 (or FIG. 3) according to aspects of the present disclosure.

Referring to FIG. 6, the fluid flow detector 202A (or the fluid flow detectors 102/202B) may be configured as a wireless electronic device with various electrical components and functionality for shunt interrogation, and may be fully compatible with any portable device such as an iPhone and/or Android system. In some embodiments, as shown, the fluid flow detector 202 may include a plurality of fluidic signal components 270. The fluidic signal components 270 may include the microfluidic channel 262 (or the microfluidic chamber 160), a pressure sensor 272 (or multiple pressure sensors), a measurement circuit 274, and a bridge circuit 276. The fluid flow detector 202 may further include a wireless chip 280 which may include a general-purpose input/output (GPIO) 282, a power component 284, an analog-to-digital converter (ADC) 286, a CPU 288, and a radio transmitter (shown as "RADIO TRANSMIT" 290). In addition, the fluid flow detector 202 may be equipped with an antenna 292 for communicating with external devices (not shown), a wake-up circuit 294, and a battery 296. The wake-up circuit 294 may be actuated by magnetic signals or otherwise, and may accommodate power savings with respect to the battery 296 by reducing or terminating power use of the fluid flow detector 202A where the wake-up circuit 294 has not been actuated. In some embodiments, the fluid flow detector 202 may further include a wireless coil (not shown) for data and/or power transmission. In some embodiments, any of the embodiments of a fluid flow detector described herein including the fluid flow detector 102 of FIG. 3 may also be configured with at least one or all of the aforementioned components. In some embodiments the wireless chip 280 is configured as a Bluetooth chip for Bluetooth wireless communication functions, or the wireless chip 280 may be configured for near-field wireless communication (NFC) as an NFC chip, or other wireless system.

Figure 7:
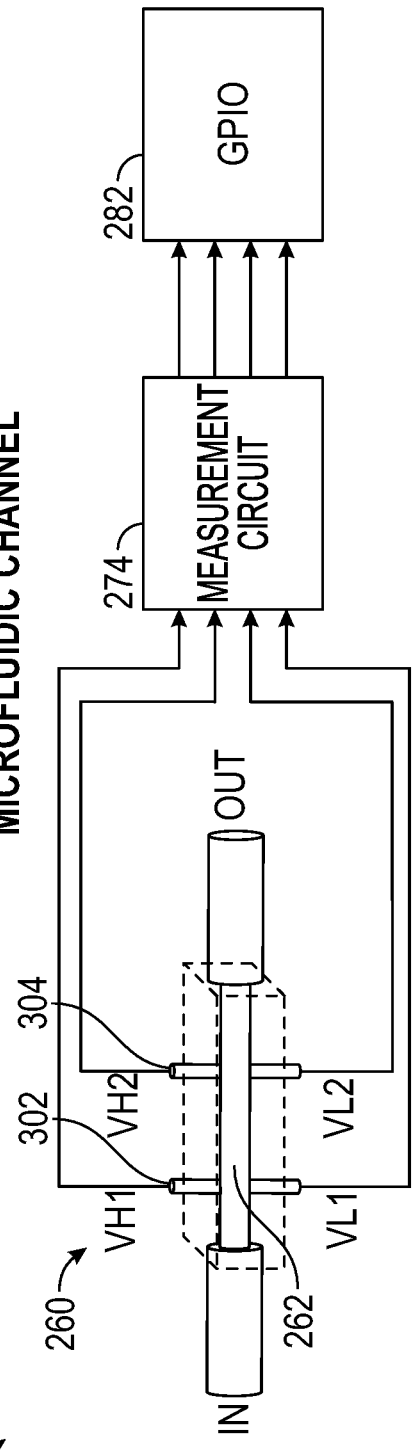
FIG. 7 is a simplified block diagram illustrating a single microfluidic channel and electrical components associated with the second embodiment of the fluid flow detector of FIG. 4, according to aspects of the present disclosure.

Referring to FIG. 7, further detail regarding the generation of measurements or other data to accommodate interrogation of shunt functionality is illustrated by way of exemplary reference to microfluidic channel 262 of the fluid flow detector 202A. The present inventive concept includes the implementation of two particular independent flow sensor based measurements, using voltage and pressure. Voltage-based measurements are illustrated in FIG. 7, which shows the microfluidic channel 262 equipped with a pair of terminals 302 and 304 in operable communication with the measurement circuit 274 and the GPIO 282. Utilizing the terminals 302 and 304 defined along the microfluidic channel 262 as shown, electrical resistance or impedance across the terminals 302 and 304 can be measured and leveraged to measure resistance to fluid in the microfluidic chamber 260. For example, the measurement circuit 274 reads zero voltage across terminals 302 and 304 when the microfluidic chamber 260 is full, indicating heavy resistance. When absorption & production are out of balance or there is any obstruction in catheters engaged to the microfluidic channel 262 of the fluid flow detector 202A, the microfluidic chamber 260 will generally be empty or half way filled. In this scenario, measurements may generally reflect 5 or 3 V corresponding to power supply voltage. This accommodates the detection of any variations in flow rates of CSF.

Figure 8:
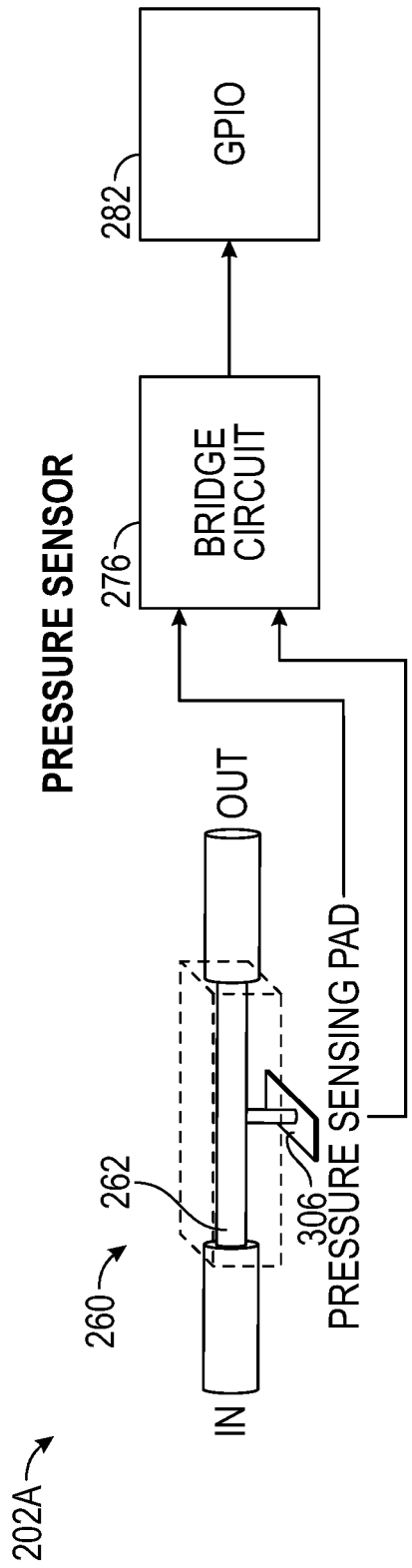
FIG. 8 is a simplified block diagram of a pressure sensor and electrical components associated with the second embodiment of the fluid flow detector of FIG. 4, according to aspects of the present disclosure.

FIG. 8 illustrates flow sensor based measurements associated with pressure. As shown, a pressure sensing pad 306 or other pressure sensor component may be positioned along the microfluidic channel 262 of the microfluidic chamber 260, and may be in operable communication with the bridge circuit 276 and the GPIO 282. The pressure sensing pad 306 may be configured to generate measurements associated with changes in pressure of the microfluidic chamber 260 related to fluid flow. In some embodiments, when conducting pressure measurements, the patient 106 may be directed to shake slightly, or the fluid flow detector 202A may be equipped with a vibrating device of some form (not shown) to accommodate the bodily fluid traversing the microfluidic channel 262 to more evenly contact the membrane (not shown) of the pressure sensing pad 306. In some embodiments, the microfluidic channels 262 of the microfluidic chamber 260 are narrower than catheters engaged to the fluid flow detector 202A. This accommodates the microfluidic chamber 260 to be completely filled (or filled to a predetermined amount) with CSF when absorption & production of CSF are balanced.

Figure 9:
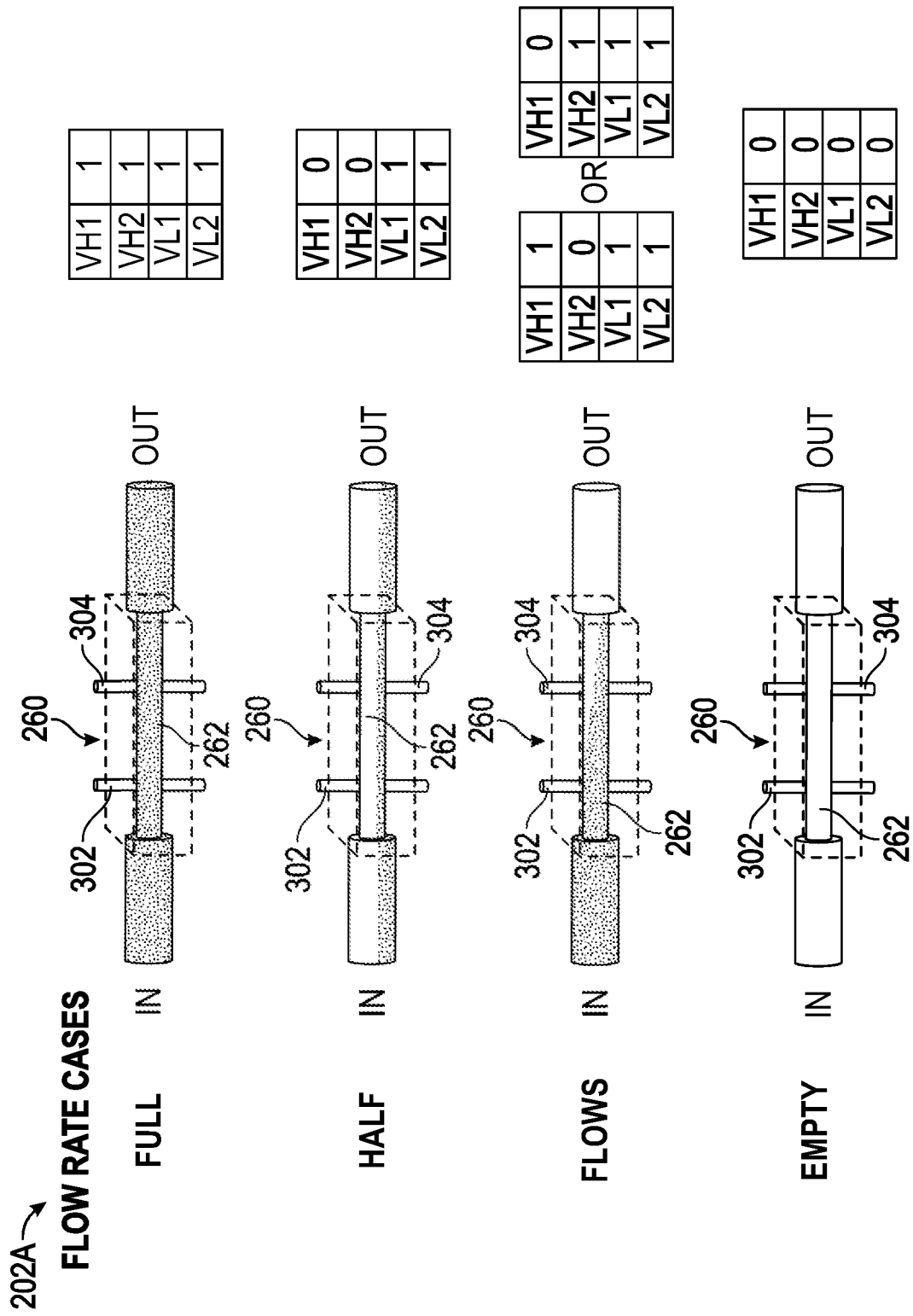
FIG. 9 is a series of simplified block diagram images illustrating flow rate cases associated with the embodiment of the fluid flow detector of FIG. 4, according to aspects of the present disclosure.

FIG. 9, associated with FIG. 7, illustrates various possible voltage measurements using the terminals 302 and 304 defined along the microfluidic chamber 260 of the fluid flow detector 202A. As indicated, the voltage measurements may be indicative as to whether the microfluidic channel 262 is full, half-empty, flowing, or entirely empty. Collectively, these voltage measurements and the pressure-based measurements of FIG. 8 may assist to provide an overall estimate as to the state of the fluid-flow and corresponding functionality of any shunt engaged to the fluid flow detector 202A. Data pertaining to pressure-based measurements of fluid flow within the fluid flow detector 202A and impedance measurements of the microfluidic chamber 260 are provided to practitioners to indicate fluid flow and capacity within the fluid flow detector 202.

Figure 10:
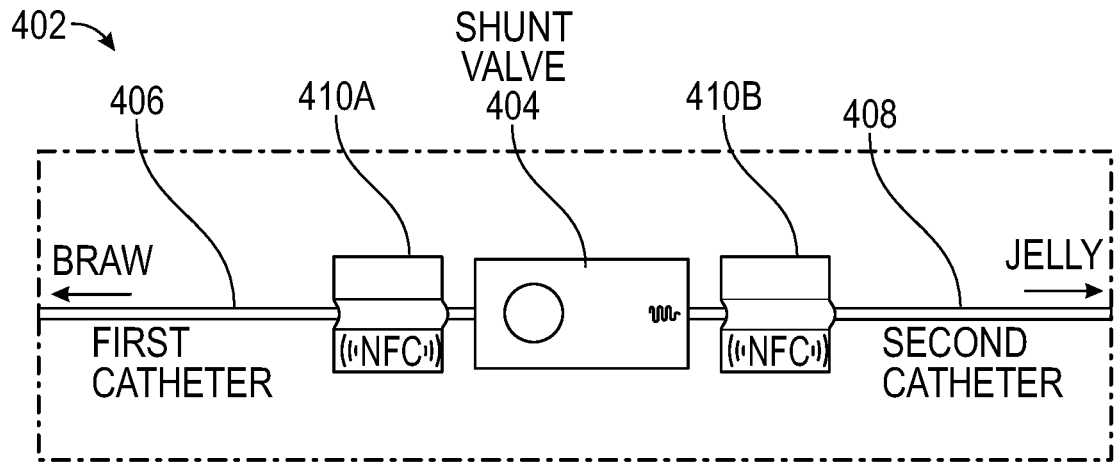
FIG. 10 is a top view of an image of another embodiment of a fluid flow detector, according to aspects of the present disclosure.
Figure 11:
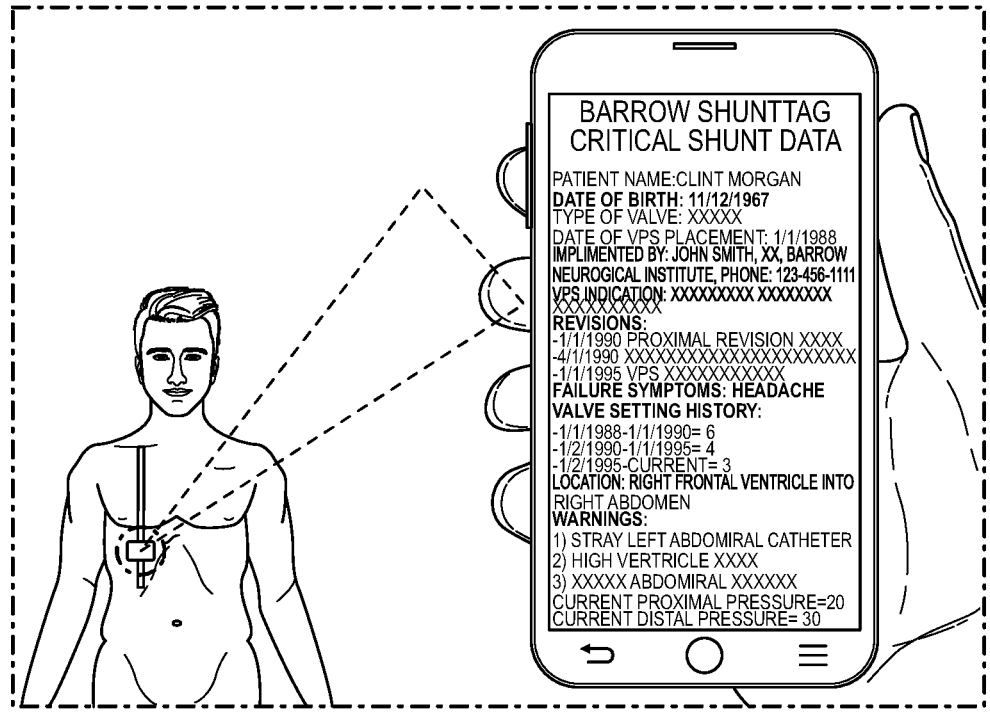
FIGS. 11-12 are images illustrating the access of data generated by the fluid flow detectors described herein using a mobile device, according to aspects of the present disclosure.
Figure 12:
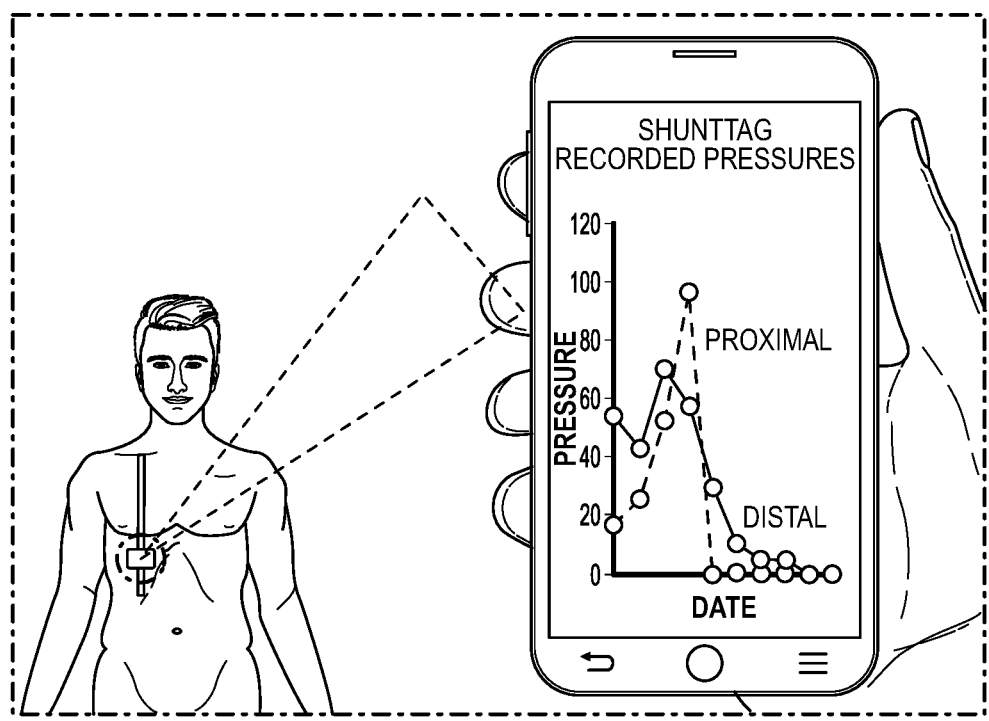

Referring to FIG. 10, another embodiment of a fluid flow detector 402 is shown. In this embodiment, the fluid flow detector 402 may include a shunt valve 404 in fluid flow engagement with a first catheter 406 and a second catheter 408. The fluid flow detector 402 may further include one or more NFC chips 410 or tags, designated 410A and 410B, embedded in a thin layer of highly flexible and biocompatible polydimethylsiloxane (PDMS) and positioned on opposite ends of the shunt valve 404 as shown. NFC theoretically affords highly secure wireless data transfer, two-way read/write communication, and inductive powering. A significant advantage of NFC technology is the ability to wirelessly power implanted devices, allowing battery-free interrogation of device functionality. The opportunity for wireless powering of implanted neurosurgical devices could theoretically allow universal wireless interrogation of shunt function, including for pressure transduction. The fluid flow detector 402 may define a miniaturized, highly flexible, and biocompatible shunt accessory, which may be clipped in-line with traditional shunt catheters.

A mobile application (possible interface shown in FIGS. 11 and 12) may be implemented to facilitate both reading and encrypting of new data into the NFC chips 410. Specifically, using e.g., a standard mobile device having access to the application, measurements such as test signal fidelity, bit rate of transmission of data, and errors in communication associated with the NFC chips 410 may be accessed.

Returning to FIG. 10, in some embodiments, the fluid flow detector 402 may integrate a wirelessly-powered microscale strain-gauge pressure sensor (not shown) to detect strain applied being proportional to pressure inside the device. In addition, wirelessly-powered amplification of pressure transducers (not shown) may facilitate chronic detection of proximal and distal pressure data, as well as an intrinsic ability to record such data within the NFC-based memory. The wireless system of the fluid flow detector 402 may further rely on an NFC-powered receiver (not shown). Wireless power delivery may occur between a transmission antenna within a handheld smartphone and the subcutaneous NFC receiver. The fluid flow detector 402 may include inlet and outlet ports or an interface which include a microscale strain-gauge sensor in ultrathin (~5 um) fractal mesh geometries to enable intimate, conformal contact with catheters. The fluid flow detector 402 may provide critical data about data transmission, signal fidelity, and unique read/write capabilities and would significantly enhance neurosurgeons' ability to efficiently evaluate patients with implanted shunts with reliable and secure data transfer using wireless data transmission available on a mobile device such as iPhone, tablet or Android Smartphone and permit unique wireless telemetry of proximal and distal catheter pressures in shunt systems.

Figure 13:
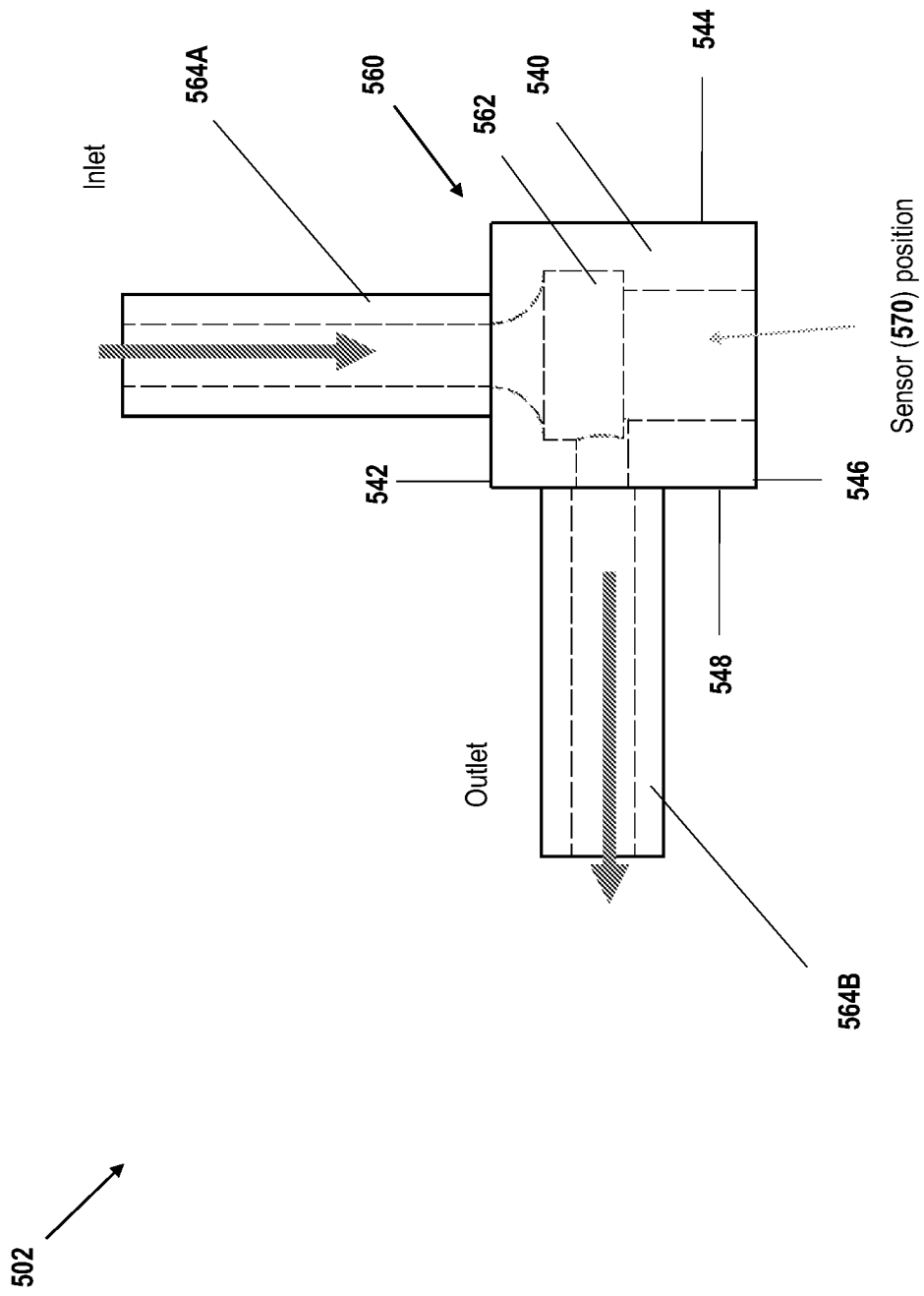
FIG. 13 is a simplified block diagram of another embodiment of a fluid flow detector, according to aspects of the present disclosure.
Figure 14:
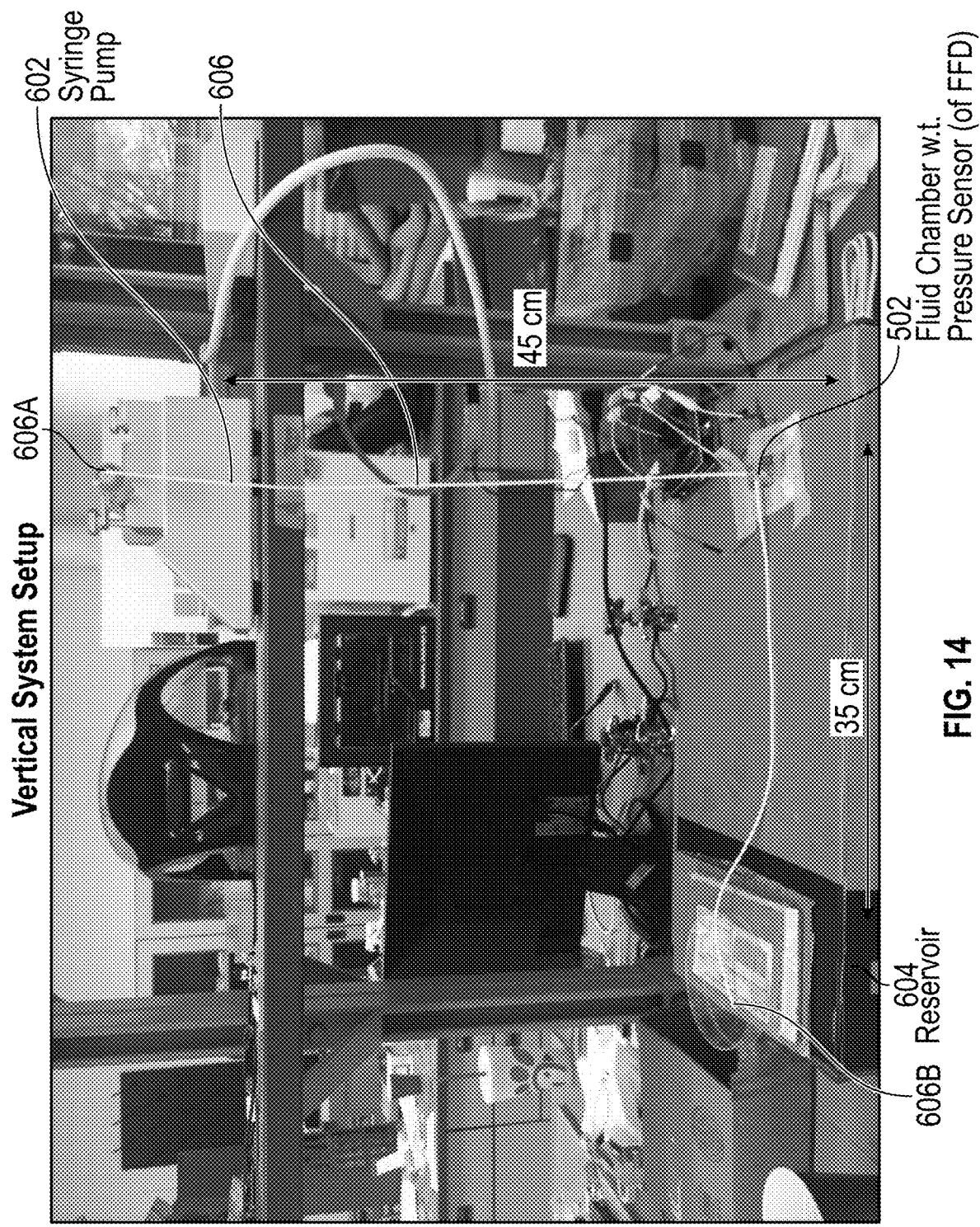
FIG. 14 is a photograph illustrating a vertical system setup/test for testing the fluid flow detector of FIG. 13.

Referring to FIG. 13, in view of the aforementioned considerations, and similar to the fluid flow detector 102 and other embodiments of a fluid flow detector described herein, a fluid flow detector 502 is shown that provides an improvement and technical solution for measuring CSF for shunt interrogation or otherwise. The fluid flow detector 502 may take the form of a wireless electronic device and may define a biocompatible body 540. In some embodiments, the body 540 may be MRI-compatible titanium having dimensions of 2-3 cm by 2-3 cm, although the present inventive concept is not limited in this regard. The body 540 may collectively be defined by a first side 542, a second side 544, a third side 546, and a fourth side 548 as indicated. A portion of the fluid flow detector 502 may define a microfluidic chamber 560 and may include a microfluidic channel 562 defined through the body 540 from the first side 542 to the fourth side 548.

In some embodiments, the microfluidic channel 562 defines a lumen that establishes a fluid pathway between an inlet port 564A and an outlet port 564B of the body 540. In the present embodiment shown, the inlet port 544A is in general orthogonal relation relative to the outlet port 564B, but the present disclosure is not limited to this configuration. In some non-limiting embodiments, the diameter of the outlet port 564B is 0.7 mm, 0.1-0.5 mm, or 0.8 mm to 1.5 mm. Further, and similar to the fluid flow detector 102, the microfluidic channel 562 may be communicably coupled or otherwise engaged with one or more catheters (not shown) using the system 100A, the system 1008, or otherwise. In addition, the fluid flow detector 502 includes at least one of a sensor 570 positioned generally in the manner shown. The sensor 570 may be a pressure sensor, such as a wirelessly-powered microscale strain-gauge pressure sensor.

Figure 25:
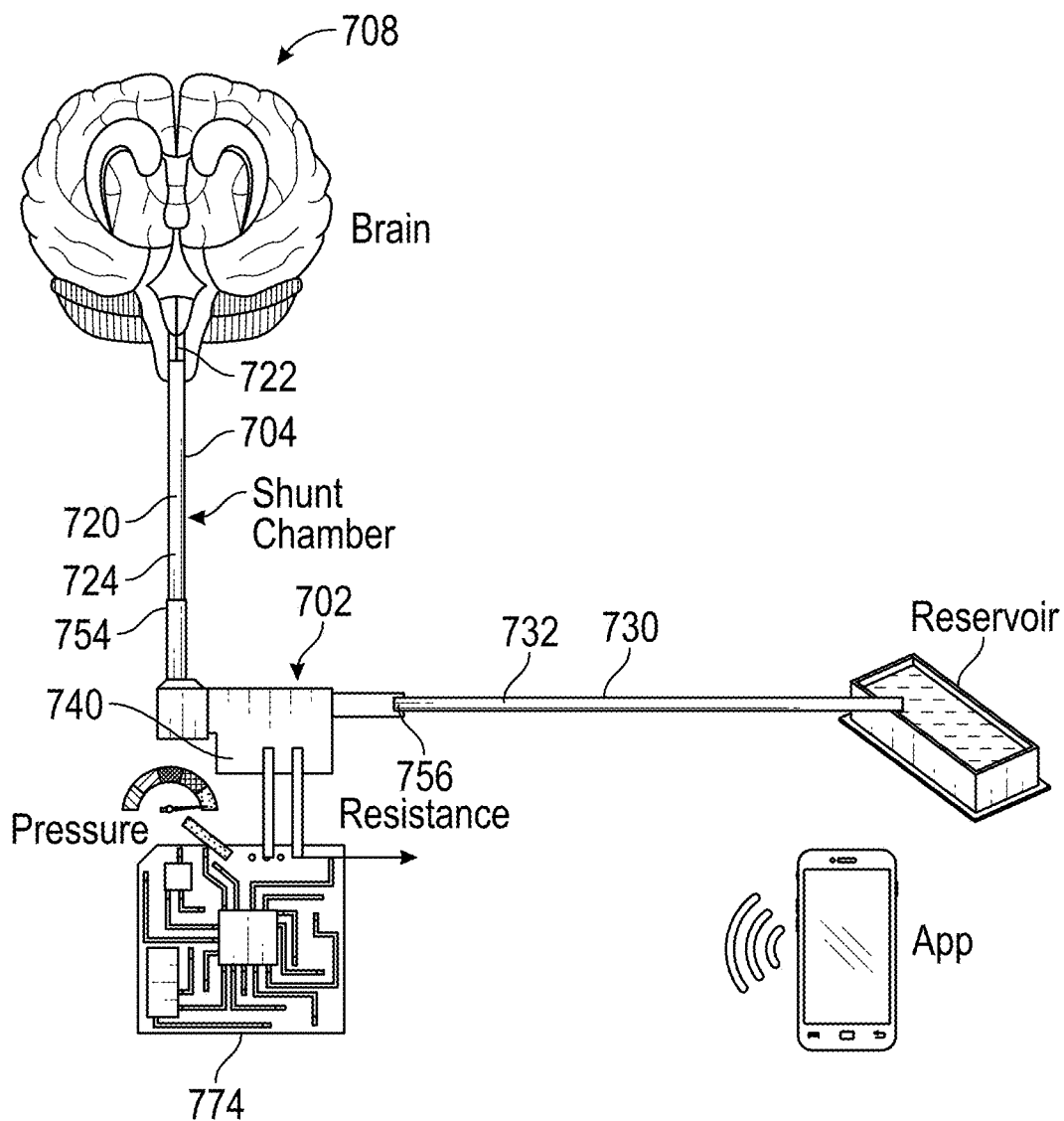
FIG. 25 is a side view illustration of another embodiment of the fluid flow detector.

Referring to FIG. 25, a fluid flow detector 702 is shown and provides an improvement and technical solution for measuring CSF for shunt interrogation or otherwise. The fluid flow detector 702 may take the form of a wireless electronic device and may define a biocompatible body 740. In some embodiments, the body 740 may be MRI-compatible titanium having dimensions of 2-3 cm by 2-3 cm, although the present inventive concept is not limited in this regard.

Figure 26:
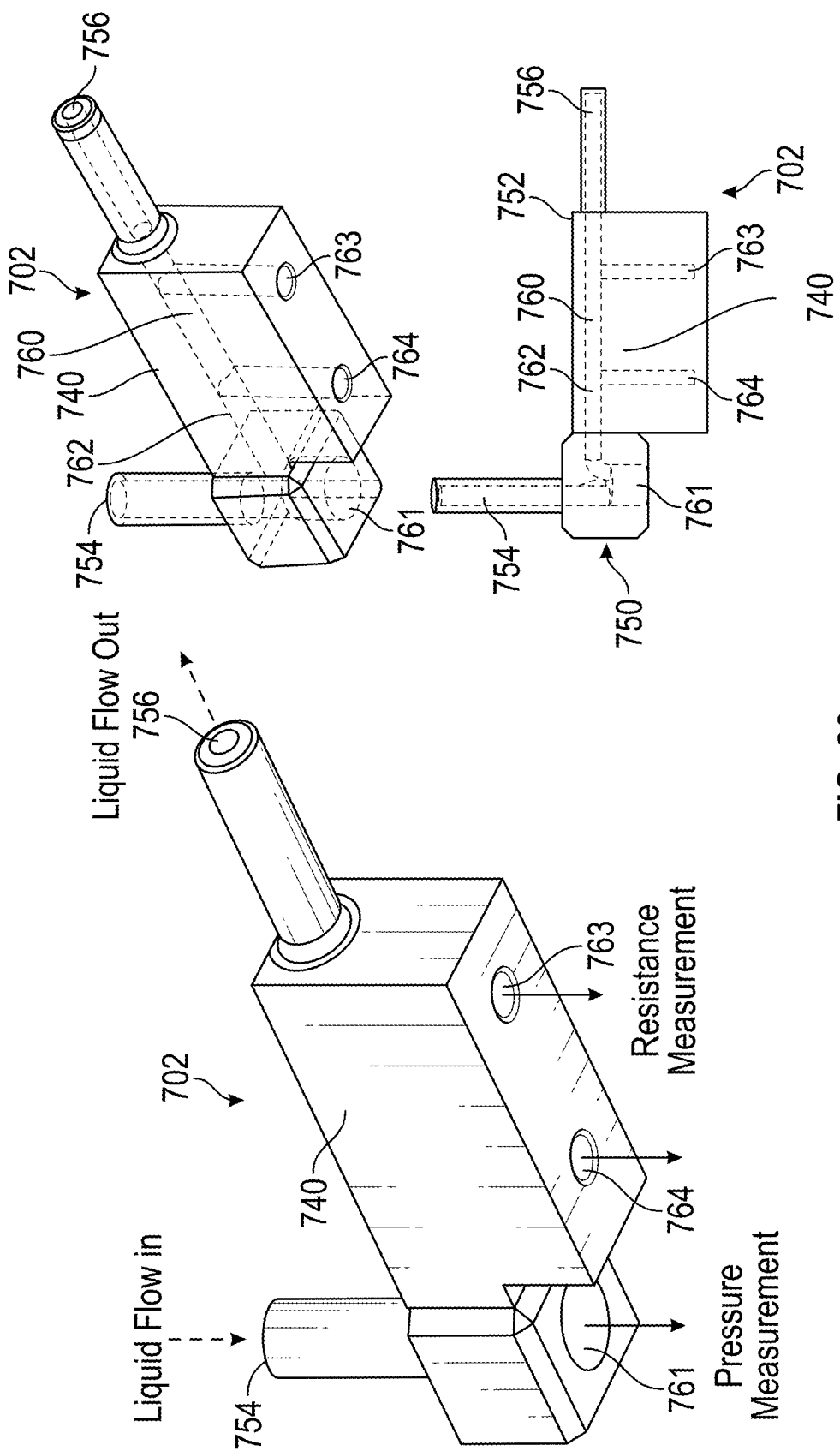
FIG. 26 is a series of perspective and side views of the fluid flow detector of FIG. 25.

In other embodiments, the body 740 may be of ceramic or a soft polymer such as PDMS. As shown in FIG. 26, a portion of the fluid flow detector 702 may define a microfluidic chamber 760 and may include a microfluidic channel 762 defined through the body 740 from the first end portion 750 to the second end portion 752. In some embodiments, the microfluidic channel 762 defines a lumen that establishes a fluid pathway between an inlet port 754 and an outlet port 756 of the body 740. Similar to the fluid flow detector 102, the microfluidic channel 762 may be engaged with one or more catheters (not shown) using the system 100A, the system 1008, or otherwise.

As further shown, the fluid flow detector 702 is in fluid flow communication or otherwise engaged to a ventriculo-peritoneal shunt (hereinafter "shunt") 704 configured to direct cerebrospinal fluid along a patient (not shown) away from a cranium or head region 708. As further shown, in some embodiments, the shunt 704 may define a first (incoming) catheter 720 positioned along the cranium region 708 of the patient with a first end 722 of the first catheter 720 engaged to a surgical site (not shown), and a second end 724 of the first catheter 720 engaged to the fluid flow detector 702. In addition, the shunt 704 may define a second (descending) catheter 730 positioned along the abdominal region of the patient with a first end 732 of the second catheter 730 engaged to the fluid flow detector 702, and a second end 734 of the second catheter 730 defining the distal termination of the shunt 704. In this manner, a proximal connection is made between the fluid flow detector 702 and the shunt 704 using the first catheter 720, and a distal connection is made between the fluid flow detector 702 and the second catheter 730 so as to permit fluid flow of cerebrospinal fluid from the first catheter 720 of the shunt 704, through the fluid flow detector 702, to the second catheter 730 of the shunt 104 and ultimately into the peritoneal region for cerebrospinal fluid drainage.

Figure 27:
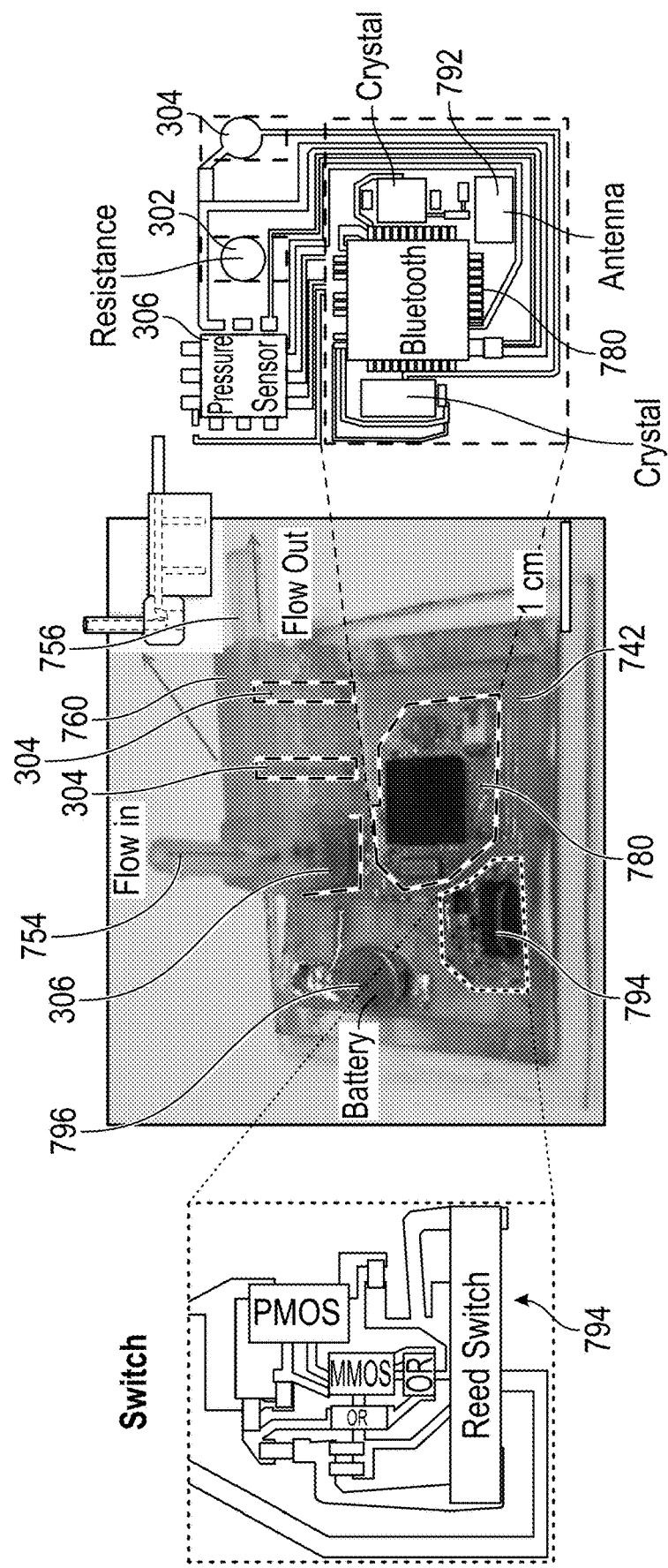
FIG. 27 is a photograph of the fluid flow detector of FIG. 25.

However, as shown in FIGS. 25 and 26 and similar to the fluid flow detector 502, in the present embodiment shown, the inlet port 754 is in general orthogonal relation relative to the outlet port 756, but the present disclosure is not limited to this configuration. As further shown, a pressure measurement passage 761 is defined directly underneath the inlet port 754 for facilitating communication between the fluid flow detector 702 and the pressure sensor 306 (FIG. 27). Similarly, a first impedance measurement passage 764 and a second impedance measurement passage 763 are defined lateral to the pressure measurement passage 761 to facilitate electrical communication between the fluid flow detector 702 and the respective pair of terminals 302 and 304 (FIG. 27) for measuring an electrical impedance of the microfluidic chamber 760.

Referring directly to FIG. 27, a substrate 742 is shown engaged with the fluid flow detector 702. As discussed above, the pressure measurement passage 761 facilitates communication between the fluid flow detector 702 and the pressure sensor 306. In some embodiments, the pressure sensor 306 is in electrical communication with a processor (not shown) and a wireless communication module 780 for transmittal to a tablet, smartphone, or other suitable device. Similarly, the pair of terminals 302 and 304 respectively establish communication between the fluid flow detector 702 and the processor (not shown) and a wireless communication module 780 for transmittal to a tablet, smartphone or other suitable device. As fluid flows into the inlet port 754, pressure measurements can be taken by the pressure sensor 306 via the pressure measurement passage 761 and the results transmitted to a suitable device for analysis. Similarly, as fluid flows through the microfluidic chamber 760, electrical impedance measurements can be taken using the first and second terminals 302 and 304 for transmittal to a suitable device for analysis. The wireless communication module 780 includes an antenna matching circuit 792 for transmittal of pressure and impedance data from the fluid flow detector 702 to a device. As shown, the substrate 742 further includes a battery 796 in electrical communication with the wireless communication module 780 by a wake up circuit 794. In some embodiments, the wake up circuit 794 is a reed switch comprising a first magnetic element 795A which activates the wireless communication module 780 when a second magnetic element 795B is placed in proximity to the first magnetic element, an operation which is illustrated in FIG. 29.

Figure 30:
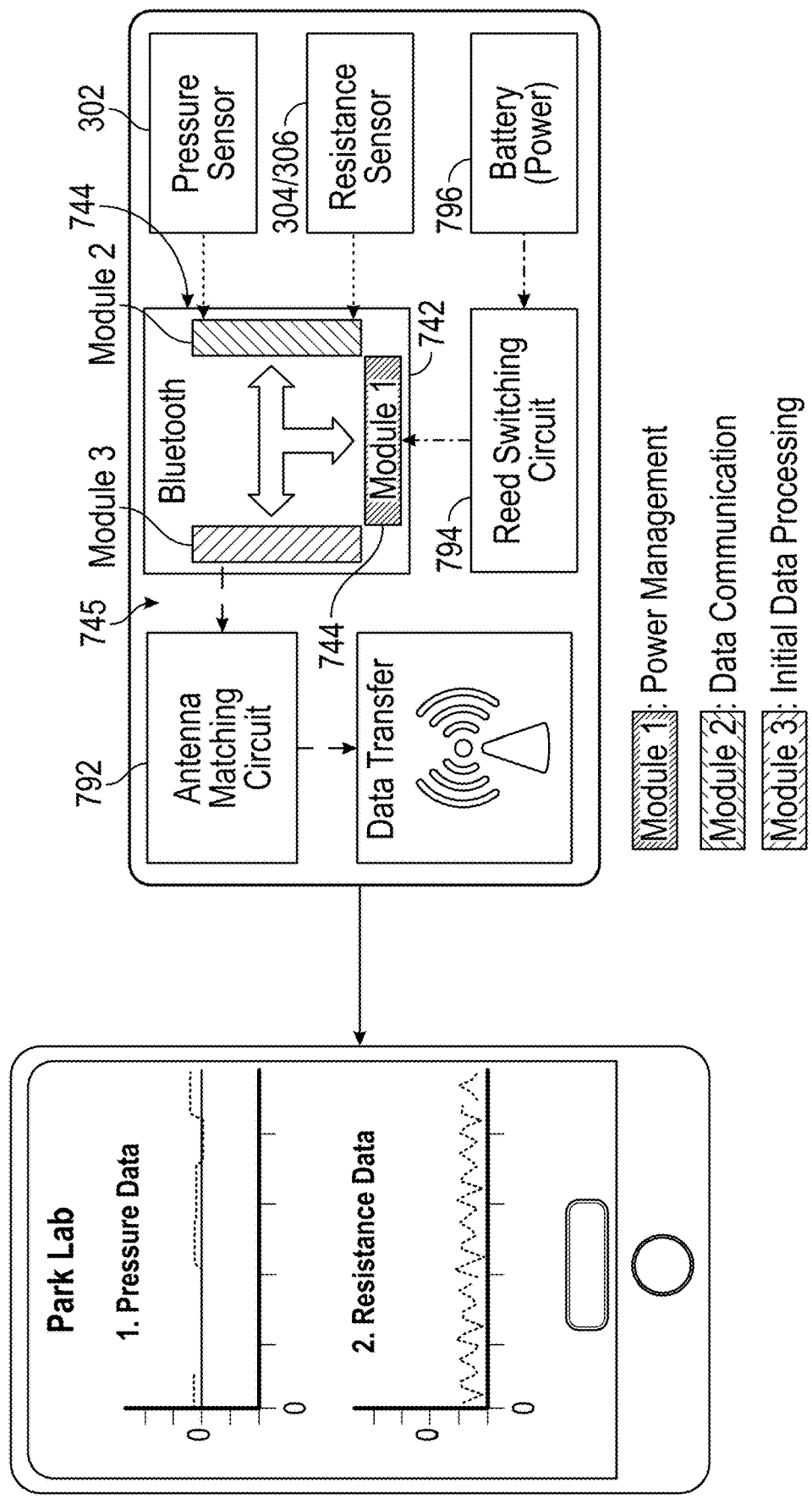
FIG. 30 is an illustration of a power management module, a data communication module and an initial data processing module of the fluid flow detector of FIG. 25.

Referring directly to FIG. 30, three modules, a power management module 743, a data communication module 744 and an initial data processing module 745 are illustrated on the substrate 742. The power delivery module 743 includes the battery 796 in electrical communication with the wireless communication module 780 by the wake-up circuit 794. The data communication module 744 includes the pressure sensor 302 for measuring the pressure exhibited by the fluid within the fluid flow detector 702 and the first and second terminals 304 and 306 for measuring an electrical impedance of the microfluidic channel 760. The pressure sensor 302 and terminals 304 and 306 are in electrical communication with the wireless communication module 780. In some embodiments, supporting circuitry is included within the data communication module 744 including the measurement circuit 274 (FIG. 6) in electrical communication with the terminals 304 and 306 for measuring the electrical impedance of the microfluidic channel 760, and a bridge circuit 276 (FIG. 6) for rectification of a voltage signal generated by the pressure sensor 302. The initial data processing module 745 is in electrical communication with the wireless communication module 780 and includes an antenna matching circuit 792 for transferring data to a suitable mobile device.

Figure 31:
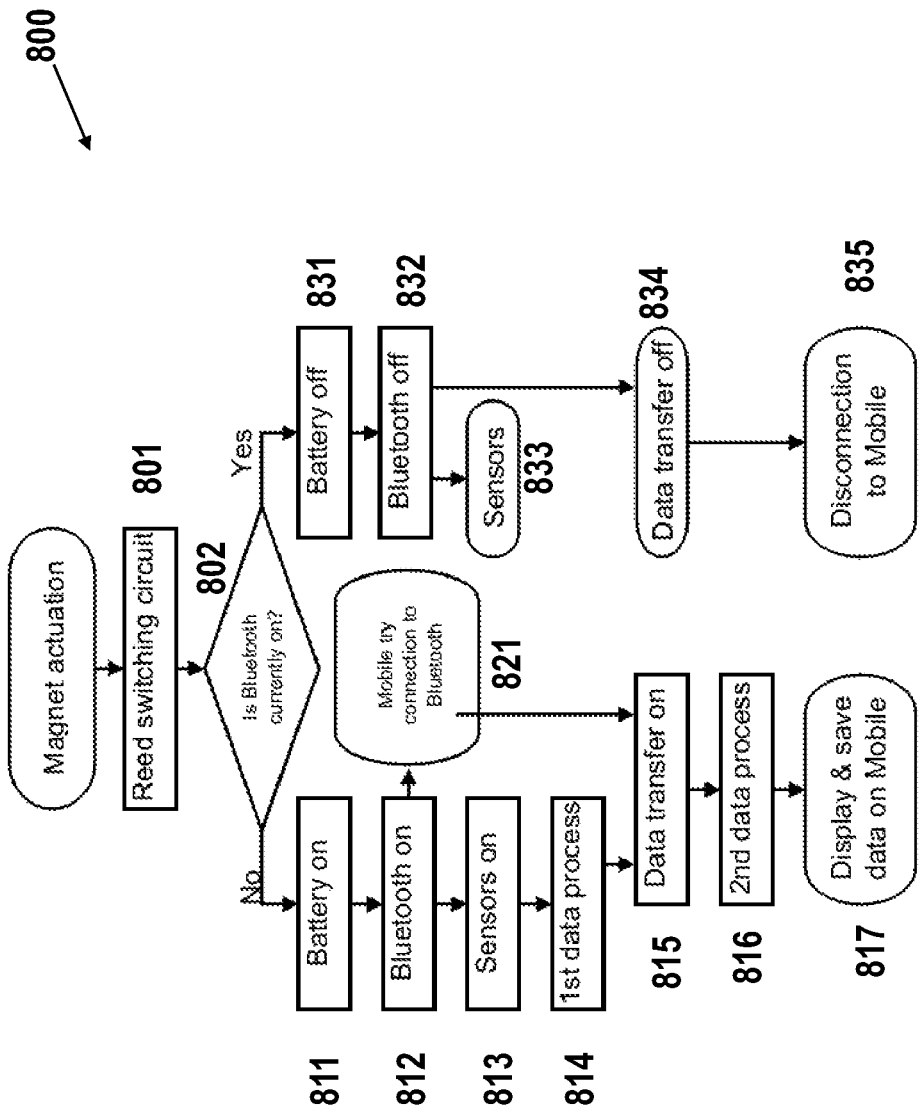
FIG. 31 is a flowchart showing a power management methodology of the fluid flow detector of FIG. 25.
Figure 38:
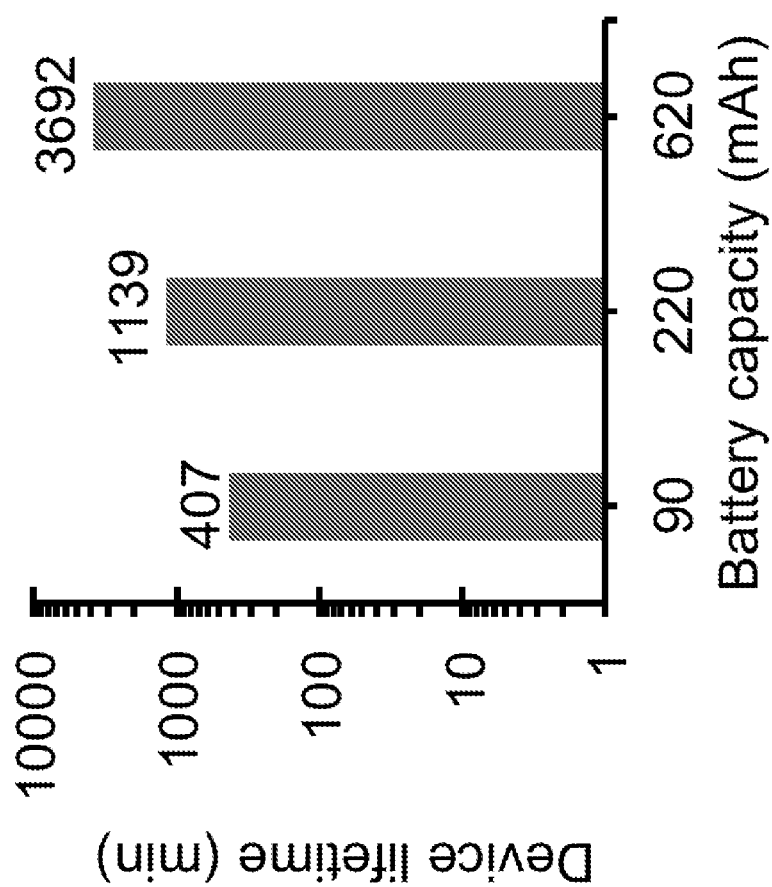
FIG. 38 is a graphical representation showing a relationship between device lifetime and battery capacity of the fluid flow detector of FIG. 25.

As shown in FIG. 31, a process 800 for transferring the data to a mobile device is presented. As shown, in block 801, the wake-up circuit 794 is activated by magnetic actuation of the first and second magnetic elements 795A and 795B. A check is then performed at block 802 to identify a present on or off state of the wireless communication module 780. If the wireless communication module 780 is currently off, then the battery 796 is turned on (block 811), the wireless communication module 780 is turned on (block 812), and the mobile device will attempt to connect to the wireless communication module 780 (block 821). The pressure sensor 302 and the terminals 304 and 306 will be activated (block 813) and a first data process is initiated (block 814) in which the pressure sensor 302 captures, digitizes and sends a variation in flow rate to the wireless communication module 780 via a serial parallel interface. Once the mobile device is connected to the wireless communication module 780, data transfer commences between the wireless communication module 780 and the mobile device. A second data process is initiated (block 816) in which the wireless communication module 780 processes the received data from the pressure sensor 302 to extract measurements from 24-bit digitized data and convert the measurements into pressure, which has a unit of pounds per square inch (PSI), and the data is displayed and saved on the mobile device. Referring back to block 802, if the wireless communication module 780 is currently turned on, then the battery 796, wireless communication module 780, pressure sensor 302 and terminals 304 and 306 are turned off in blocks 831, 832, and 833. Data transfer between the device and the fluid flow detector 702 will cease (block 834) and disconnection from the device will be complete (block 835). In some embodiments, the fluid flow detector 702 can include an alarm mechanism (not shown) which can periodically initiate pressure measurement and impedance measurement using the pressure sensor 302 and terminals 304 and 306 and alert a user or medical practitioner if a malfunction is detected. Referring to FIG. 38, device lifetimes are shown with respect to various battery capacities of the battery 796.

Figure 21A:
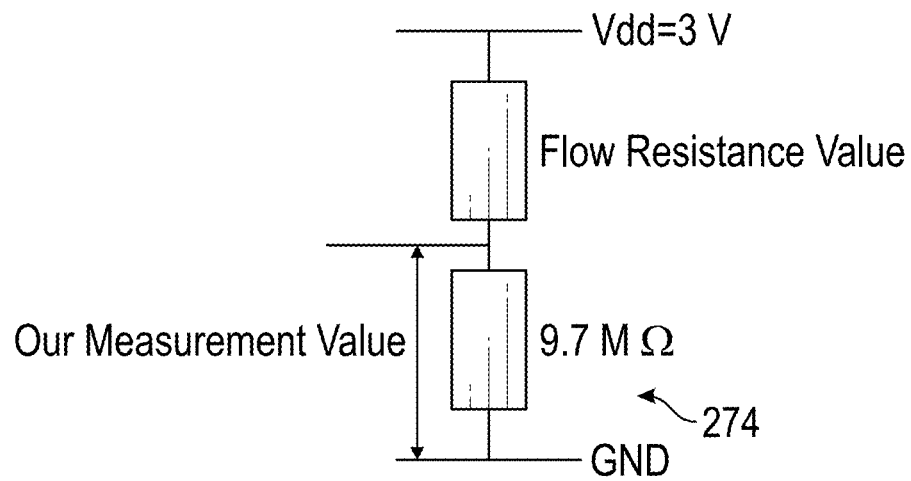
FIG. 21A is a simplified electrical diagram.
Figure 39:
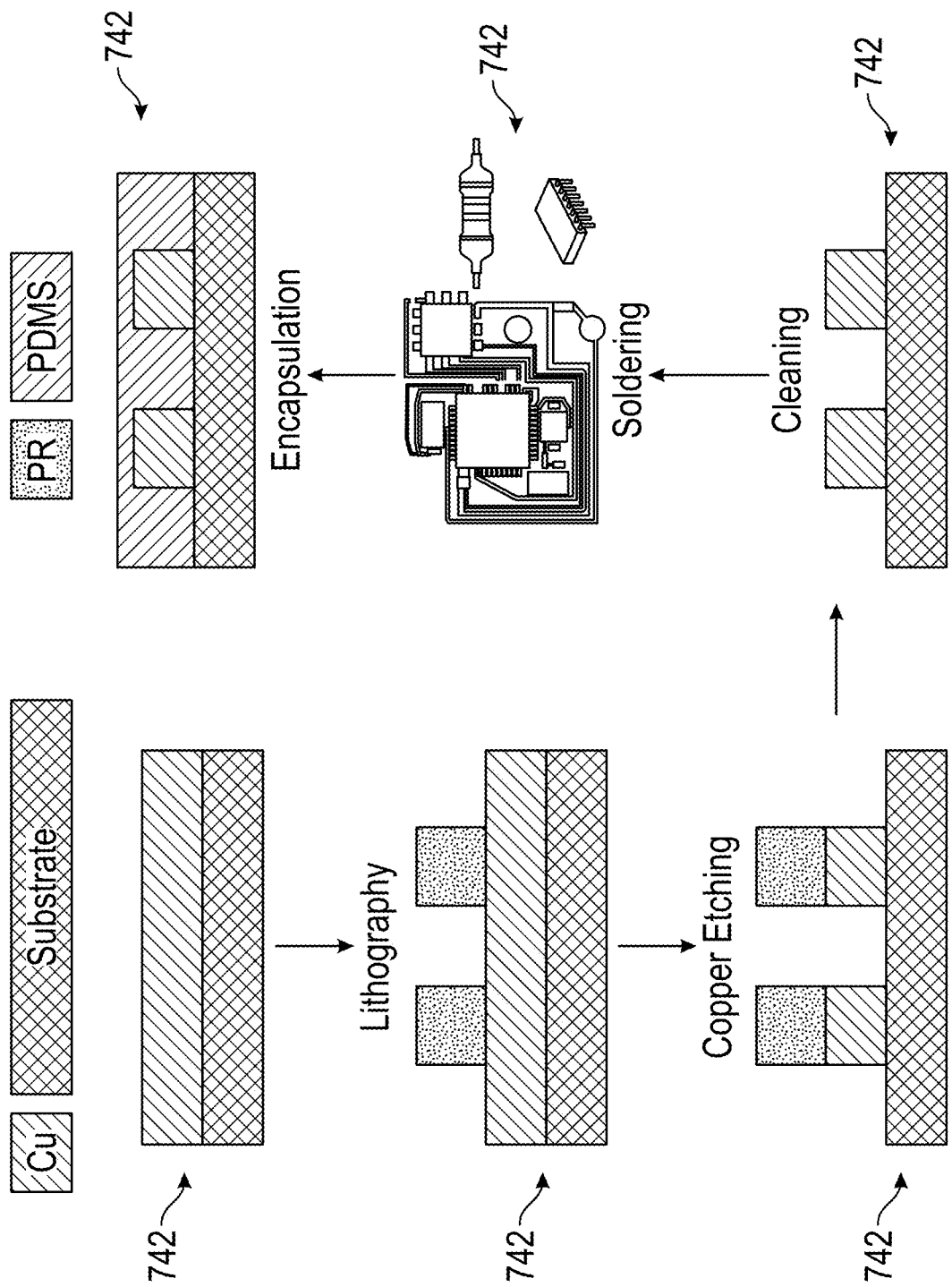
FIG. 39 is an illustration of a fabrication process for the manufacture of electronic components of the fluid flow detector of FIG. 25.

Referring directly to FIGS. 21A, 22B, 23B, the measurement circuit 274 for measuring an impedance of the microfluidic channel 760 is embodied as a voltage divider. The microfluidic channel 760 is treated as an unknown resistance or impedance value in series with a known resistor value, which was selected to be 9.7 MΩ due to the conductivity of cerebrospinal fluid (CSF), however embodiments of the measurement circuit do not limit the known resistor value to this value. A test voltage is applied at a first end portion 762 of the microfluidic channel 760 and a neutral or ground voltage is applied at an opposite end portion of the known resistor. A voltage difference across the known resistor value is thus induced and measured, and an impedance value of the microfluidic channel 760 can then be deduced. An exemplary process for manufacture of the substrate 742 is shown in FIG. 39.

Testing and Supportive Experimentation

The embodiment of the fluid flow detector (FFD) 502 was tested for efficacy under different environments to assess fluid flow detection using pressure measurements in view of simulated changes in fluid flow by providing external devices with access to data generated by the sensor 570 using Bluetooth or other wireless communication protocol, during various testing conditions. For example, referring to FIG. 14, the FFD 502 was subjected to a vertical pressure test. In this test, the FFD 502 was positioned along a flat surface, a syringe pump 602 was suspended over the FFD 502 (by ~45 cm) to simulate fluid flow, and a reservoir 604 was positioned along the flat surface proximate to (~35 cm) the FFD 502 as shown. One or more sections of catheter tubing 606 was used to communicably couple the syringe pump 602 to the FFD 502, with a proximal portion 606A engaged to the syringe pump 602 as shown and a distal portion 606B positioned along a petri dish (reservoir).

Figure 15A:
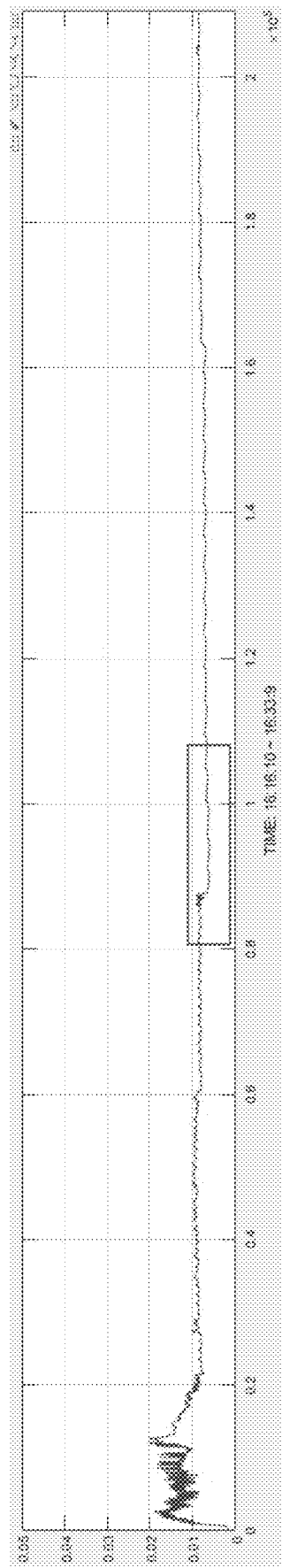
FIGS. 15A-15B are graphs illustrating measurements from the testing of FIG. 14.
Figure 15B:
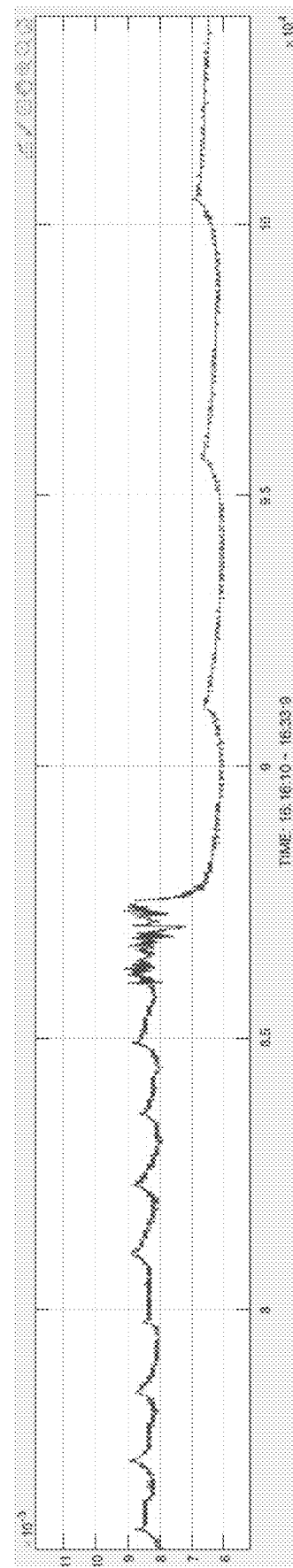
Figure 17:
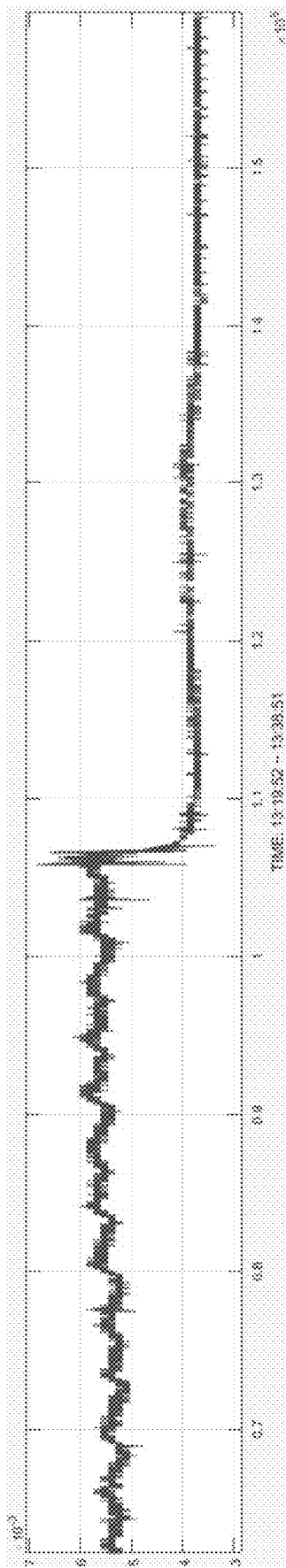
FIG. 17 is a graph illustrating additional measurements from the testing of FIG. 14.

Referring to FIG. 15A, the graph shows a full range of data taken from the vertical pressure test experiment; the x-axis referring to milliseconds and the y-axis referring to pounds per square inch (PSI). The area outlined in FIG. 15A represents the data of the graph of FIG. 15B. This area outlined is centered on the transition point between the high flow rate and the low flow rate. This was the area of focus for the present experiment given that the majority of data before/after is waiting for the pressure to stabilize.

FIG. 16 illustrates a dry variation of the present vertical pressure test under dry conditions where the distal portion 606B of the catheter tubing 606 extends from the outlet port 564B of the FFD 502 and is suspended over a dry petri dish. Under these dry conditions, the change in pressure was shown to be 0.0015596 PSI and FIG. 16 illustrates that a shift happens when the syringe rate adjusted at the syringe pump 602 is modified from 0.5 ml/min to 0.1 ml/min. Conversely, under a wet condition variation shown in FIG. 17, the change in pressure is 0.0012597 PSI when the syringe rate adjusted at the syringe pump 602 is modified from 0.5 ml/min to 0.1 ml/min. A wet condition variation is where the distal portion 606B of the catheter tubing 606 is placed in a water-filled petri dish.

Figure 18:
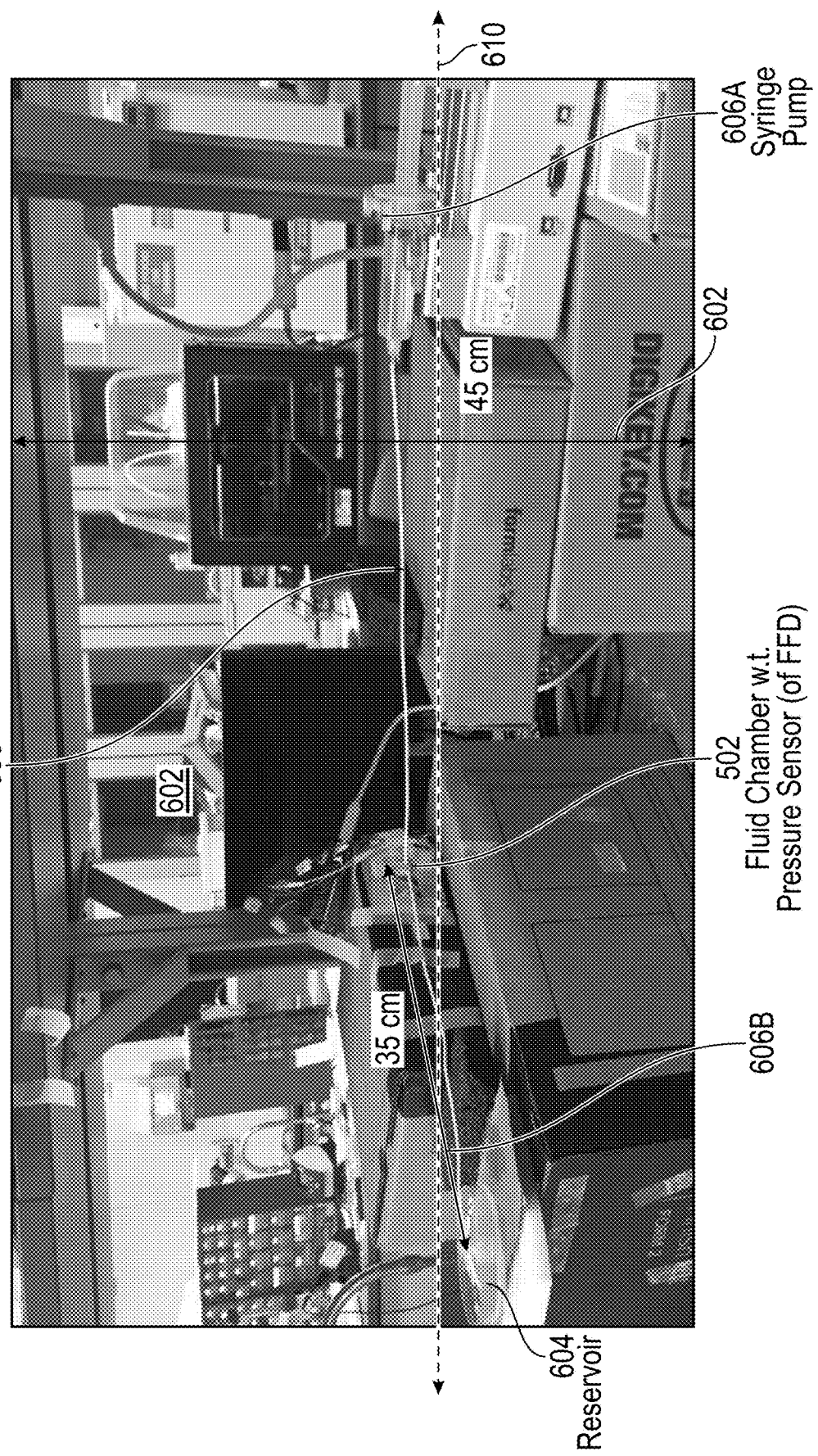
FIG. 18 is a photograph illustrating a horizontal system setup/test for testing the fluid flow detector of FIG. 13.
Figure 19:
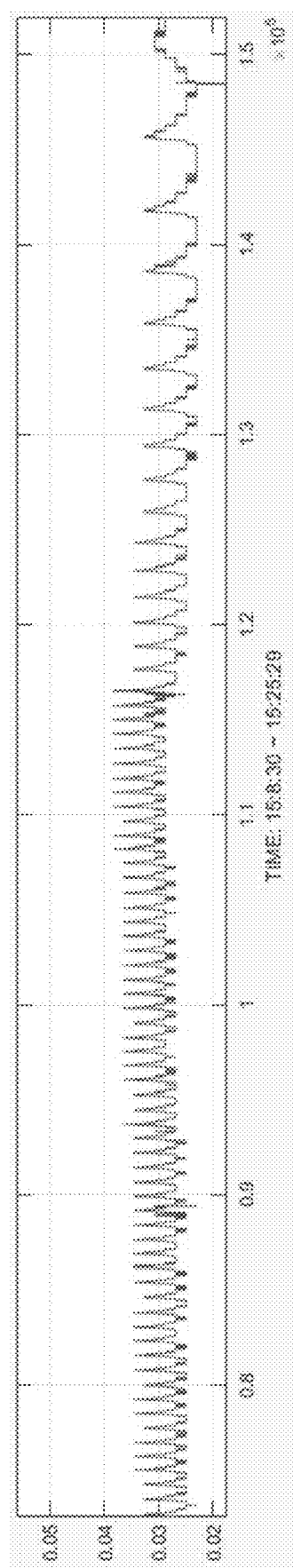
FIG. 19 is a graph illustrating additional measurements from the testing of FIG. 18.
Figure 20:
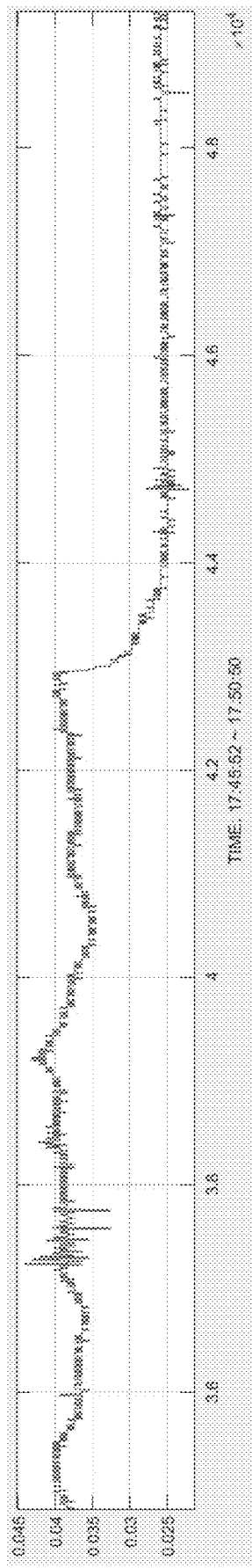
FIG. 20 is a graph illustrating additional measurements from the testing of FIG. 18.

Referring to FIG. 18, the FFD 502 was further subjected to a horizontal pressure test. In this test, the FFD 502, the syringe pump 602, and the reservoir 604 were all positioned along a common general horizontal plane 610 and coupled to the catheter tubing 606 as indicated. FIG. 19 illustrates a dry variation of the present horizontal pressure test under dry conditions where the distal portion 606B of the catheter tubing 606 extends from the outlet port 564B of the FFD 502 and is suspended over a dry petri dish. Under these dry conditions, the change in pressure was shown to be 0.007685 PSI and a shift happens when the syringe rate adjusted at the syringe pump 602 is modified from 4 ml/min to 1 ml/min. Conversely, under a wet condition variation shown in FIG. 20, the change in pressure is 0.013448 PSI when the syringe rate adjusted at the syringe pump 602 is modified from 4 ml/min to 1 ml/min. A wet condition variation is where the distal portion 606B of the catheter tubing 606 is placed in a water-filled petri dish.

Figure 21B:
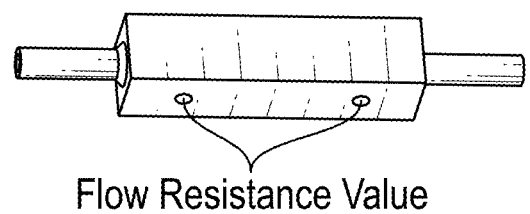
FIG. 21B is an image illustrating flow resistance values associated with a resistance measurement test of the fluid flow detector embodiment of FIG. 4 whereby voltage is measured across a chamber of the fluid flow detector under various simulated shunt conditions.
Figure 24:
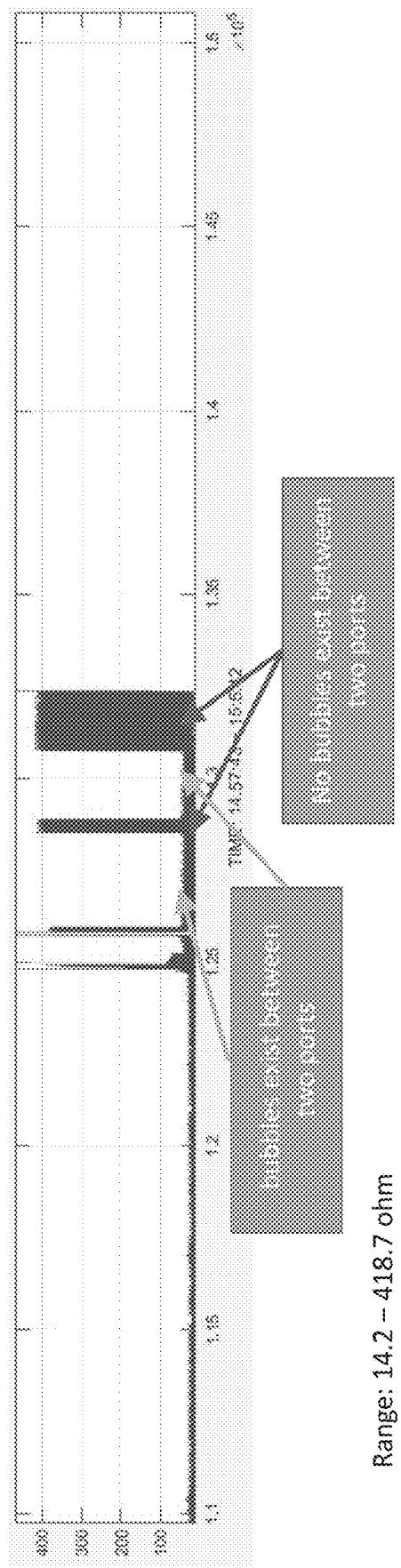
FIG. 24 is a graph indicating measurements derived from the resistance measurement test of FIGS. 21A-21B when a fluid flow detector is partially occupied by fluid flow; i.e., when there is partial flow present.

Referring to FIG. 21, one embodiment of the fluid flow detector, fluid flow detector (FFD) 202A of FIG. 4, was further subjected to an impedance measurement test. For the subject test, a 9.7 MΩ (~10 MΩ) resistor was used in voltage divider, and graphs show the voltage across the chamber. Referring to FIGS. 22A-22B, based on measurements utilizing a multimeter (not shown), it was discovered that the FFD 202A fully filled with a fluid provides measurements of 10.19~11 MΩ. Referring to FIGS. 23A-23B, it was discovered that the FFD 202A with no flow present provides measurements 0 or a very small expected measurement value. Referring to FIG. 24, it was further discovered that the FFD 202A being partially filled provides measurements of 12~15.89 MΩ.

Figure 28:
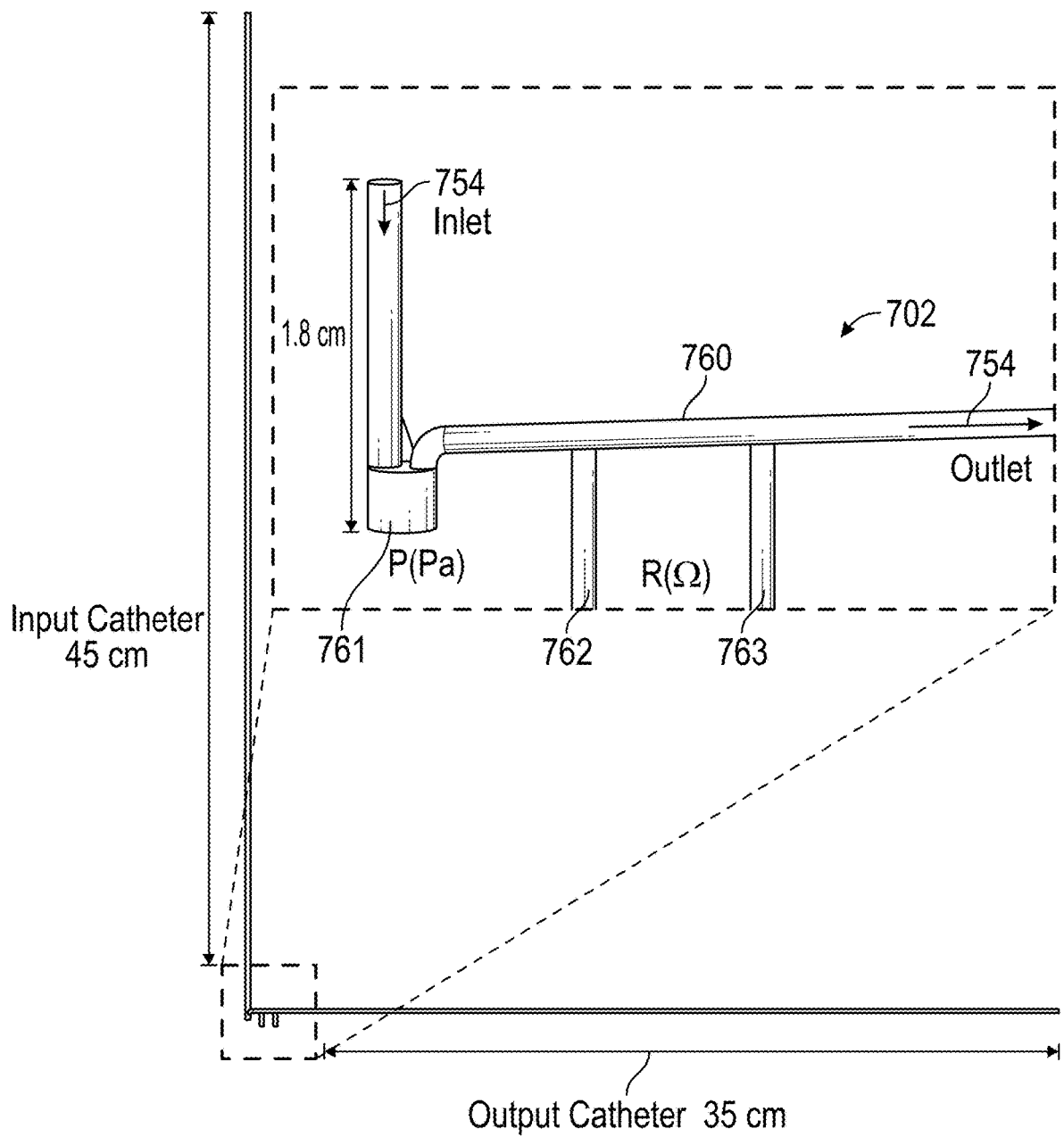
FIG. 28 is a graphical representation showing a simulated fluid flow detector of FIG. 25 having a 45 cm catheter inlet, shunt chamber and 35 cm catheter outlet.
Figure 32:
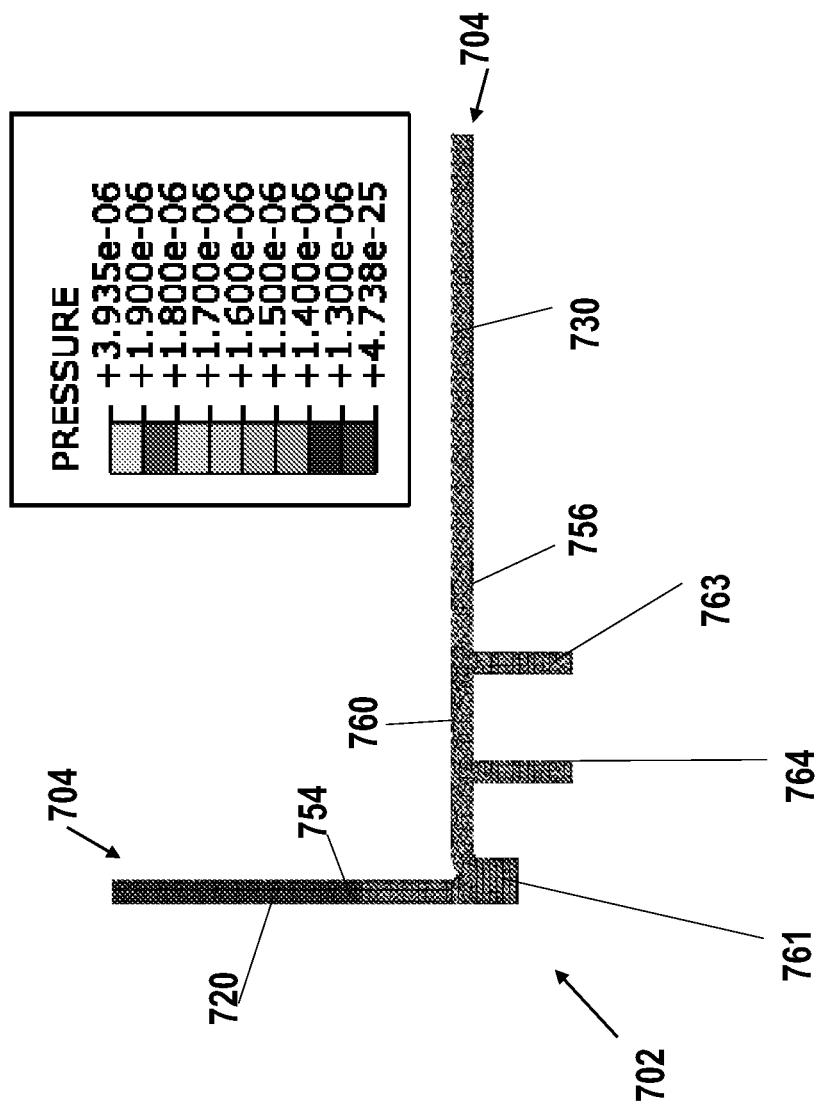
FIG. 32 is a graphical representation showing pressure variation (MPa) in the area close to a shunt chamber of the fluid flow detector of FIG. 25.

As shown in FIGS. 28-38, the fluid flow detector 702 was tested for efficacy. FIGS. 28-30 show analysis of the different pressure values through the fluid flow detector 702 and to determine the maximum changes according to the different flux 0.01/0.1/0.3 mL/min with different input diameters values 1.1/1.3/1.5 mm. The CSF fluid path that is the inner part of the microfluidic chamber 760 is considered in the simulation. Atmospheric pressure is considered at the end of the second catheter 730 and is set to zero (FIG. 28). FIG. 32 shows the values of pressure (MPa) for the different sections of the shunt chamber 704, the inlet diameter is 1.1 mm and the inlet flow is 0.01 mL/min. The pressure sensor shows 1.8 Pa as a result. FIG. 33 shows relative pressure, where the maximum changes between values are given as the diameter increases. The pressure variation considering the Ø=1.1 mm, 1.5 mm are 52.05, 52.90, 53.53 Pa for Ø=1.1, 1.3 and 1.5 mm respectively. The largest change is provided with Ø=1.5 mm.

Figure 34:
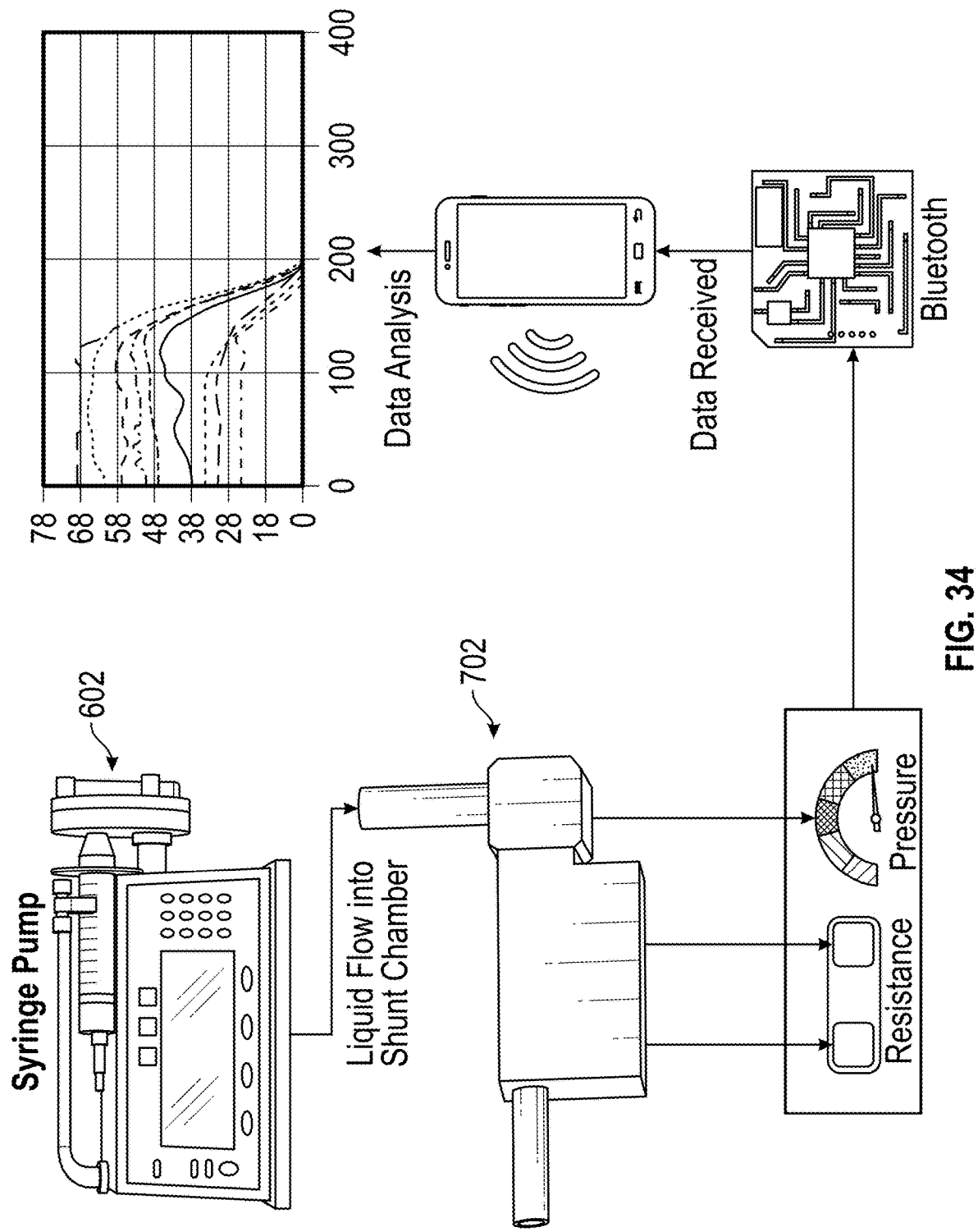
FIG. 34 is an illustration of an experimental setup for testing of the fluid flow detector of FIG. 25.
Figure 35:
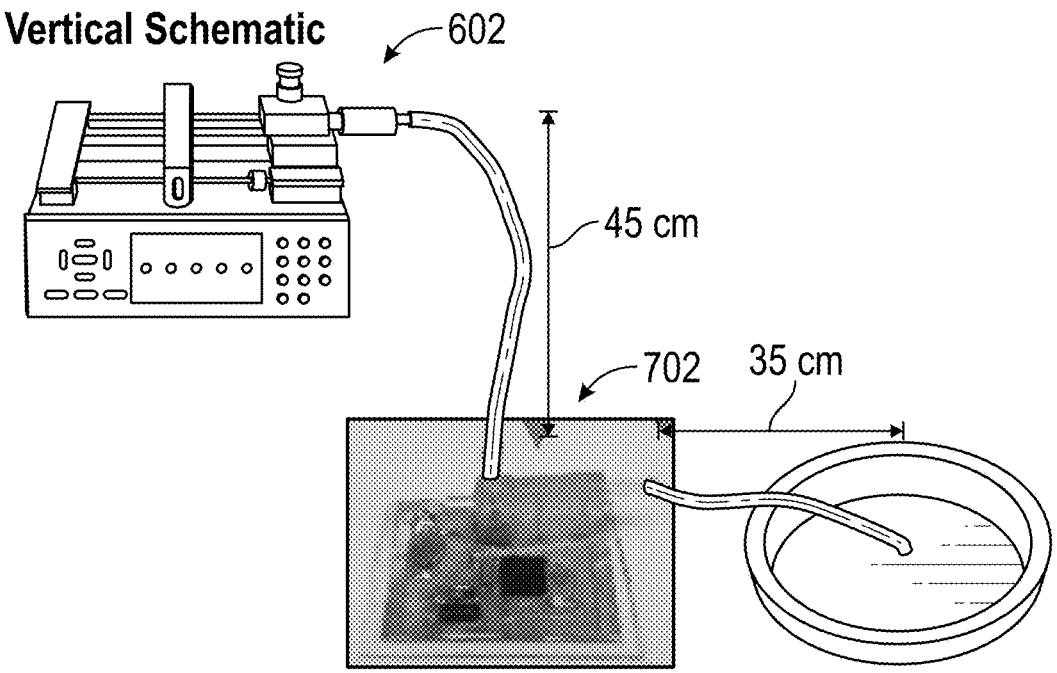
FIG. 35 is an illustration showing a vertical schematic of the experimental setup for testing the fluid flow detector of FIG. 25.
Figure 36:
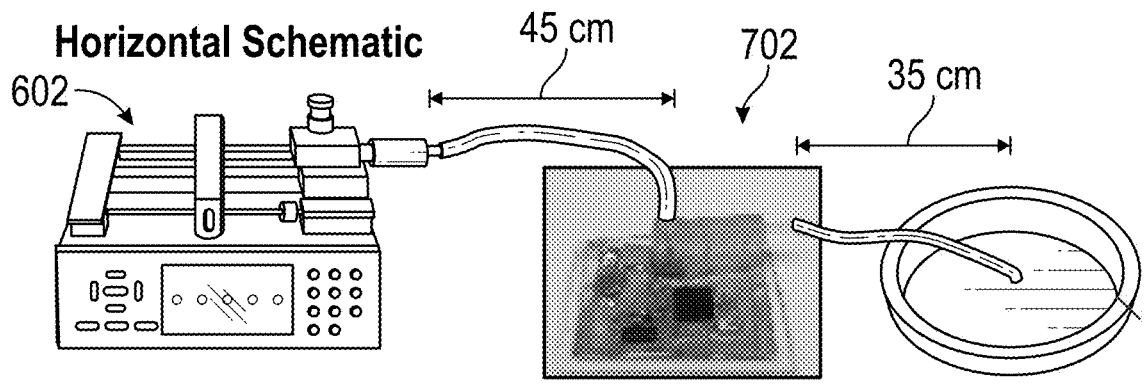
FIG. 36 is an illustration showing a horizontal schematic of the experimental setup for testing the fluid flow detector of FIG. 25.
Figure 37:
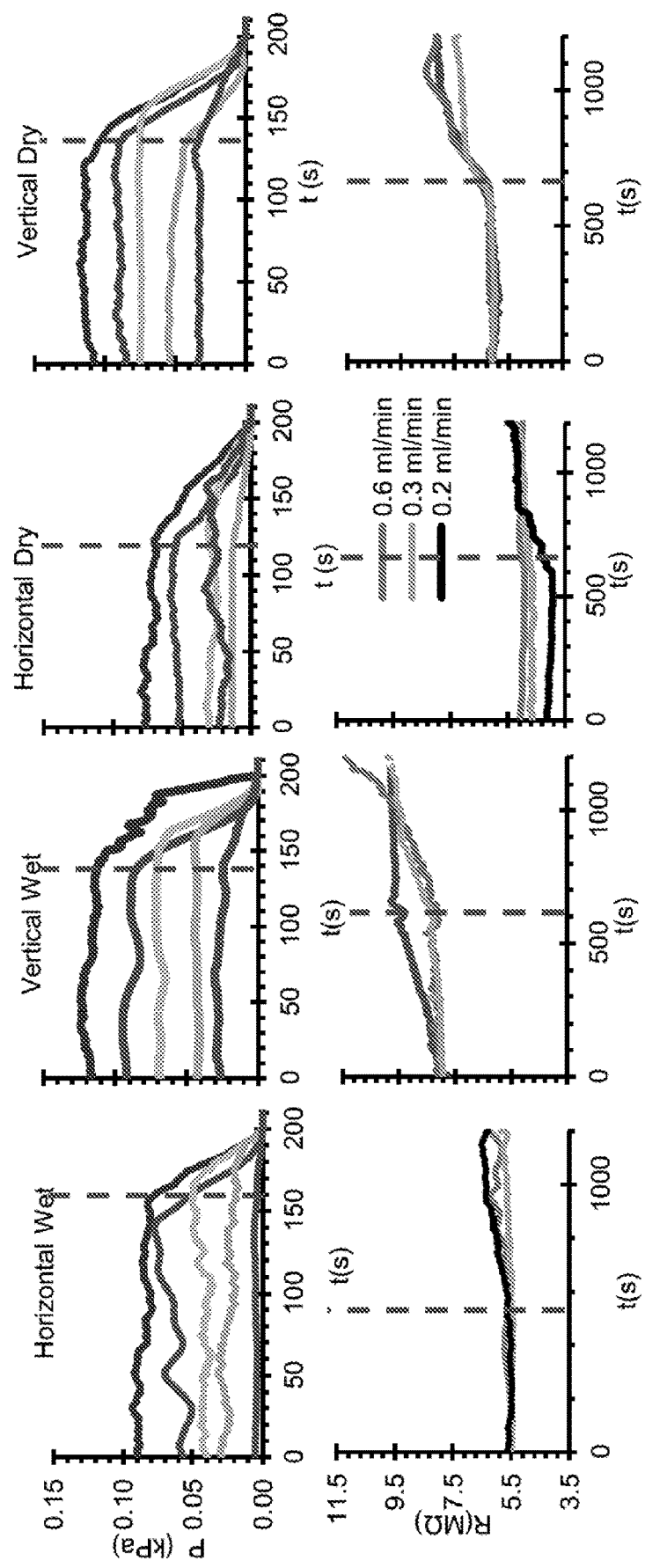
FIG. 37 is a set of graphical representations showing measurement of flow rates and resistance under several conditions, wet, dry, horizontal vertical setting and different flow rates of the fluid flow detector of FIG. 25.

FIG. 34 shows the complete test setup where different flow values are generated by a syringe pump 70, connected through the first catheter 120 to the fluid flow detector 102 where pressure and impedance values (multimodality) are measured to be plotted in the application (tablet). The test setup is positioned vertically (FIG. 35) and horizontally (FIG. 36) to model when the patient is stand up and laid down respectively. In the vertical mode of FIG. 35, the syringe pump is placed over the shunt chamber while in the horizontal mode of FIG. 36 gravity has almost no effect. Other conditions which are analyzed are the dried and wet conditions, where the output flow will face the atmospheric pressure or the water pressure respectively. Five different flow values 0.9, 0.7, 0.5, 0.3 and 0.1 ml/min are set in the syringe pump with horizontal/vertical and dry/wet conditions. Values of pressure and resistance/impedance are plotted in FIG. 37. The vertical wet diagram shows the largest variation of pressure followed by the vertical dry, horizontal wet and horizontal dry. The largest impedance values are shown in the vertical wet, followed by the vertical dry, horizontal wet and horizontal dry. Implications of wet conditions and dry conditions can help practitioners interpret the impedance measurement. For example, when the second catheter 730 is in a dry condition, then it can be assumed that the microfluidic chamber 760 is fully filled with cerebrospinal fluid or empty, suggesting that impedance measurement values are either infinite or finite impedance. When the outlet catheter 730 is in a wet condition or semi-wet condition, the measured impedance value will be within a range between extreme impedance values. A physician or researcher can predict what a normal or acceptable impedance value will be based on the expected condition of the outlet catheter 730, for example if it drains out into a reservoir or into another bodily cavity that naturally has a wet condition.

Overall, the novel embodiments of the fluid flow detector (i.e., fluid flow detectors (102/202A/202B/402/502) described herein function as a universal shunt accessory which accesses fluid flow at the most critical portion (distal end of fluid flow), each of the embodiments shown may wirelessly transmit measurements to external devices via a highly secured communication pathway such as nearfield communication (NFC), Wi-Fi, or Bluetooth when requested. Capabilities to detect any variation in flow rate in real time and/or monitor it over long period of time provides full evaluations of cerebrospinal fluid under a variety of physiological conditions. Fully biocompatible, soft mechanical construction of the device embodiments minimizes irritation and damage to surrounding tissues.

As further noted above, in some embodiments, battery-free operation obviates the need for a large battery pack allowing for miniaturized and low-cost construction and low maintenance. For example, universal design of the inlet port and outlet port of the fluid flow detector 102 make it fully compatible with any modern commercial spinal fluid shunt system and provides steps toward the wide spread use of this technology in minimally invasive medical devices.

In some embodiments, the shunt 104 may further include a shunt reservoir and valve component (not shown). The shunt reservoir and valve component may store excess cerebrospinal fluid that flows through the shunt 104. In these embodiments, cerebrospinal fluid flow from the patient may be stored in the shunt reservoir and valve component which is operable to periodically pass the cerebrospinal fluid through the fluid flow detector 102. Once fluid flow of cerebrospinal fluid exits the fluid flow detector 102, the cerebrospinal fluid may be allowed to flow into the peritoneal cavity of the individual.

In addition, any of the components of the system 100A or the system 100B described above, and/or the fluid flow detector 102 or the fluid flow detector 202 may include radiopaque markers or may otherwise be formed with at least a portion of radiopaque material. As such, an X-ray apparatus (not shown) may be implemented to capture X-ray images and identify the specific orientation and position of such components relative to the patient. This may be particularly of benefit to assess whether the fluid flow detector 102/202 has shifted post-implantation.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for interrogating shunt functionality, comprising:
    a fluid flow detector, comprising:
        a microfluidic chamber including a microfluidic channel defining a fluid pathway through the microfluidic chamber for accommodating a bodily fluid therethrough, the microfluidic chamber including an inlet port defining a first lumen and an outlet port defining a second lumen, the second lumen being in fluid flow communication and orthogonal with the first lumen, and the first lumen including a pressure measurement passage located distal to a junction between the first lumen and the second lumen;
        a pair of terminals positioned along the second lumen of the microfluidic chamber;
        a pressure sensing pad having a membrane positioned within the pressure measurement passage of the microfluidic chamber, the membrane defining a surface normal that is parallel with a direction of elongation of the first lumen; and
        a wireless chip;
    wherein the fluid flow detector is configured to generate fluid flow measurements associated with changes in pressure and voltage using the pair of terminals and pressure sensing pad and provide access to the fluid flow measurements via a communication pathway using the wireless chip.

2. The system of claim 1, wherein the fluid flow detector is in fluid flow engagement with a shunt, and the fluid flow measurements are indicative as to functionality of the shunt.

3. The system of claim 1, wherein the inlet port is in fluid flow communication with one end of the fluid pathway and with cerebrospinal fluid associated with a surgical site, and wherein the fluid flow detector further comprises:
    the outlet port in fluid flow communication with an opposite end of the fluid pathway.

4. The system of claim 1, wherein the fluid flow detector is configured to be implanted subcutaneously along an abdominal region of a patient.

5. The system of claim 4, wherein a position of the fluid flow detector relative to the patient is detectable via an X-ray apparatus.

6. The system of claim 1, wherein an electrical impedance of the microfluidic channel is determined using the pair of terminals.

7. The system of claim 1, wherein a voltage value is determined for each terminal of the pair of terminals.

8. The system of claim 1, wherein each terminal of the pair of terminals is in electrical communication with the fluid pathway of the microfluidic chamber.

9. The system of claim 1, wherein the fluid flow detector further comprises:
    a wake up circuit in electrical communication with the wireless chip, the wake up circuit comprising a first magnetic element, wherein the wake up circuit activates the wireless chip when a second magnetic element is placed in proximity to the first magnetic element.

10. A method, comprising:
    providing a fluid flow detector comprising a microfluidic chamber, the microfluidic chamber having a microfluidic channel defining a fluid pathway through the microfluidic chamber, the microfluidic chamber including an inlet port defining a first lumen and an outlet port defining a second lumen, the second lumen being in fluid flow communication and orthogonal with the first lumen, and the first lumen including a pressure measurement passage located distal to a junction between the first lumen and the second lumen;
    measuring, by processor, an electrical impedance value exhibited by the microfluidic chamber associated with a fluid flow;
    measuring, by processor, a pressure value exerted on a pressure sensing pad having a membrane disposed within the pressure measurement passage of the microfluidic chamber, the membrane defining a surface normal that is parallel with a direction of elongation of the first lumen;
    providing access to the electrical impedance value and the pressure value by a communication pathway facilitated by a wireless communication module; and
    determining a flow state of a fluid within the microfluidic chamber using the electrical impedance value and the pressure value.

11. The method of claim 10, further comprising:
    measuring a voltage value taken at a first terminal and a voltage value taken at a second terminal, wherein the first terminal is positioned at a first end of the microfluidic chamber in electrical communication with the fluid pathway and wherein the second terminal is positioned at an opposite second end of the microfluidic chamber in electrical communication with the fluid pathway.

12. The method of claim 11, further comprising:
    identifying a flow state of the fluid within the microfluidic chamber using the voltage value taken at the first terminal and the voltage value taken at the second terminal, wherein a logic high voltage value is indicative of fluid within the fluid pathway contacting the first or second terminal and wherein a logic low voltage value is indicative of no fluid within the fluid pathway contacting the first or second terminal.

13. The method of claim 10, wherein the electrical impedance value of the microfluidic chamber is measured using a resistor coupled to the microfluidic chamber in a voltage divider configuration and wherein a voltage value measured across the resistor is used to infer the electrical impedance value of the microfluidic chamber.

14. The method of claim 10, further comprising:
assessing a dryness condition of an outlet port of the fluid flow detector using the measured electrical impedance value, wherein if a measured impedance value is within a range defined between an extreme low impedance value and an extreme high impedance value then the outlet port is in a wet condition and wherein if a measured impedance value is an extreme low impedance value or an extreme high impedance value then the outlet port is in a dry condition.

\* \* \* \* \*